(12) United States Patent
Singh et al.

(10) Patent No.: US 12,223,506 B2
(45) Date of Patent: Feb. 11, 2025

(54) METHODS AND SYSTEMS FOR MULTI-FACTOR AUTHENTICATION BASED PAYMENT

(71) Applicant: MASTERCARD INTERNATIONAL INCORPORATED, Purchase, NY (US)

(72) Inventors: Sachin Kumar Singh, Pune (IN); Sandeep Parvathareddy, Krishna Nagar Guntur (IN); Hemant Arora, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 119 days.

(21) Appl. No.: 18/062,702

(22) Filed: Dec. 7, 2022

(65) Prior Publication Data

US 2023/0196374 A1 Jun. 22, 2023

(30) Foreign Application Priority Data

Dec. 21, 2021 (IN) .............................. 202141059715

(51) Int. Cl.
G06Q 20/40 (2012.01)
G06Q 20/38 (2012.01)
G06Q 20/42 (2012.01)

(52) U.S. Cl.
CPC ..... *G06Q 20/4016* (2013.01); *G06Q 20/3821* (2013.01); *G06Q 20/42* (2013.01)

(58) Field of Classification Search
CPC ................................................ G06Q 20/4016
See application file for complete search history.

(56) References Cited

U.S. PATENT DOCUMENTS 9,275,211 B2 3/2016 Stubblefield
9,275,228 B2 3/2016 Niemela et al.
(Continued)

FOREIGN PATENT DOCUMENTS

CA 3173102 * 3/2020 ............ H04W 12/00
WO 2016050990 A1 4/2016
WO 2020101787 A1 5/2020

OTHER PUBLICATIONS

Matsuoka et al., in "A Score Fusion Method by Neural Network in Multi-Factor Authentication," from CODASPY, 2020 (Year: 2020).*

(Continued)

*Primary Examiner* — Olabode Akintola
*Assistant Examiner* — Brandon M Duck
(74) *Attorney, Agent, or Firm* — Barta Jones, PLLC

(57) ABSTRACT

Embodiments provide methods and systems for analyzing device behavior data in multi-factor authentication (MFA) process. The method includes receiving, by a server system, a request in association with a payment transaction between a cardholder and a merchant. The request includes a cardholder identifier and information of a successful verification of a user input entered by the cardholder to perform MFA of the payment transaction. The method includes identifying user profile data stored in a database based on the cardholder identifier. The user profile data includes information of a plurality of registered user devices associated with the cardholder. The method includes performing device behavioral analysis of one or more user devices. The method includes generating an MFA token associated with the payment transaction based on the device behavioral analysis. The method includes transmitting the MFA token for authorizing the payment transaction to a payment server associated with a payment network.

20 Claims, 12 Drawing Sheets

(56) References Cited

U.S. PATENT DOCUMENTS

| | | |
|---|---|---|
| 10,108,791 B1 | 10/2018 | Masterman |
| 2009/0260064 A1 | 10/2009 | McDowell et al. |
| 2018/0097806 A1 | 4/2018 | Blinn |
| 2020/0372495 A1 | 11/2020 | Maheshwari et al. |
| 2021/0211416 A1 | 7/2021 | Mossoba et al. |
| 2021/0217020 A1 | 7/2021 | Dutt |
| 2022/0417267 A1* | 12/2022 | Szigetti .................. H04L 29/06 |

OTHER PUBLICATIONS

Mohammed, M.M. et al., "A multi-layer of multi factors authentication model for online banking services", IEEEXplore, Aug. 26, 2013, https://ieeexplore.ieee.org/abstract/document/6633936, 2 pages.
Khattri, V et al., "A Novel Distance Authentication Mechanism to Prevent the Online Transaction Fraud" SpringerLink, Jan. 11, 2018, https://link.springer.com/chapter/10.1007/978-981-10-7281-9_13, 7 pages.

* cited by examiner

METHODS AND SYSTEMS FOR MULTI-FACTOR AUTHENTICATION BASED PAYMENT

CROSS-REFERENCE TO RELATED APPLICATION

This application claims priority to Indian Patent Application No. 202141059715, filed Dec. 21, 2021, entitled "Methods and Systems for Multi-Factor Authentication Based Payment Transactions", the entirety of which is hereby incorporated by reference herein.

TECHNICAL FIELD

The present disclosure generally relates to a secure authentication system and, more particularly to, electronic methods and systems for performing a multi-factor authentication (MFA) for payment transactions based on analyzing device behavior of user devices associated with cardholders.

BACKGROUND

Over the last few years, there is a significant increase in the number of digital payment transactions happening across the world. Generally, a cardholder utilizes a payment instrument (e.g., payment card, payment account, payment wallet, etc.) to perform a digital payment transaction on a merchant's website to purchase goods or services offered by the merchant. The digital payment transaction may be performed on a laptop (i.e., through an electronic commerce website accessed on a web browser) or on a mobile device (i.e., through a mobile commerce application installed in the mobile device). To complete the digital payment transaction, an authentication process is performed to verify that the digital payment transaction is being performed by a genuine cardholder (i.e., owner of the payment instrument) only and not by a fraudster. The authentication process is important for the successful completion of the digital payment transaction as there can be a scenario where a fraudster may unethically utilize the payment instrument belonging to the cardholder to perform a fraudulent transaction without the consent of the cardholder.

With the increase in digital payment transactions, there is also an increase in the online fraudulent transactions performed by fraudsters. To eliminate or reduce such fraudulent transactions, multi-factor authentication (MFA) is used for authenticating each digital payment transaction. In general, MFA is an authentication method or process in which the cardholder needs to submit at least two or more authentication tokens or evidence to gain access to a resource (e.g., application, online account, transaction, etc.). For example, the cardholder may need to enter one authentication token (e.g., a secure code, one-time password (OTP), etc.) received in an electronic mail and other authentication tokens (e.g., a secure code, one-time password (OTP), etc.) received as a text message through a short message service (SMS), to authenticate a digital payment transaction. However, despite the MFA process, online transaction fraud is still prevalent in the digital payment transactions ecosystem as fraudsters may utilize advanced techniques such as cloning of SIM card inserted inside a user device on which the two or more authentication tokens are received, hacking of electronic-mail accounts associated with the user on which the two or more authentication tokens are received, performing a man in the middle attack to access the two or more authentication tokens, and so on to bypass the MFA process.

Even if the two or more authentication tokens received from the user device of the cardholder are correct, there is a need to verify or authenticate that the user device from which the two or more authentication tokens are received, belongs to the genuine cardholder (i.e., owner of the payment instrument).

Thus, there exists a technological need to overcome the above-stated limitations.

SUMMARY

Various embodiments of the present disclosure provide systems and methods for reducing multi-factor authentication (MFA) fraud.

In an embodiment, a computer-implemented method is disclosed. The method includes receiving, by a server system, a request in association with a payment transaction between a cardholder and a merchant. The request includes a cardholder identifier associated with the cardholder and information of successful verification of a user input entered by the cardholder to perform multi-factor authentication (MFA) of the payment transaction. The method includes identifying, by the server system, user profile data stored in a database based, at least in part, on the cardholder identifier. The user profile data includes information of a plurality of registered user devices associated with the cardholder stored for the MFA. The method includes performing, by the server system, device behavioral analysis of one or more user devices from the plurality of registered user devices associated with the cardholder. The method includes generating, by the server system, an MFA token associated with the payment transaction based, at least in part, on the device behavioral analysis. The method further includes transmitting, by the server system, the MFA token to a payment server associated with a payment network. The MFA token is utilized for authorizing the payment transaction.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
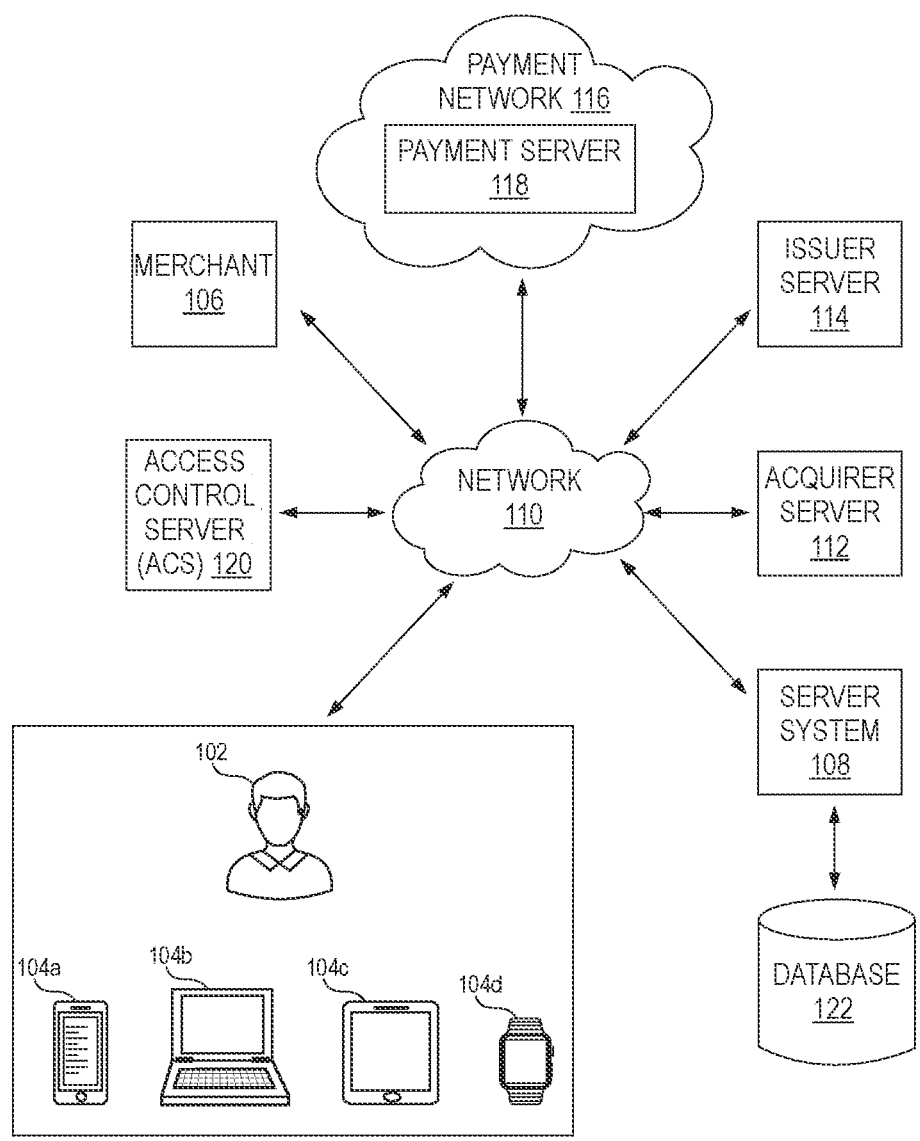
FIG. 1 illustrates an example representation of an environment related to at least some embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "issuer", used throughout the description, refers to a financial institution normally called an "issuer bank" or "issuing bank" in which an individual or an institution may have an account. The issuer also issues a payment card, such as a credit card or a debit card, etc. Further, the issuer may also facilitate online banking services such as electronic money transfer, bill payment, etc., to the account holders through a server system called "issuer server" throughout the description.

The term "payment card", used throughout the description, refers to a physical or virtual card linked with a financial or payment account that may be used to fund a financial transaction to a merchant or any such facility via the associated payment account. Examples of payment cards include, but are not limited to, debit cards, credit cards, prepaid cards, virtual payment numbers, virtual card numbers, forex cards, charge cards, and stored-value cards. A payment card may be a physical card that may be presented to the merchant for funding the payment. Alternatively, or additionally, the payment card may be embodied in form of data stored in a user device, where the data is associated with a payment account such that the data can be used to process the financial transaction between the payment account and a merchant's financial account.

The term "payment network", used throughout the description, refers to a network or collection of systems used for the transfer of funds through the use of cash-substitutes. Payment networks may use a variety of different protocols and procedures to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by Mastercard®, etc.

The term "multi-factor authentication (MFA)", used throughout the description, herein refers to an authentication process in which a cardholder needs to provide at least two or more pieces of evidence or authentication factors to authenticate a payment transaction. The user can prove he is who he claims to be by providing information only he knows, like a password or answers to challenge questions (e.g., a single-factor authentication), by entering a One-Time Password (OTP) (e.g., a two-factor authentication), and by providing a characteristic unique to who he is, such as a fingerprint, a retina scan, or a voice recognition (e.g., a three-factor authentication). Multi-factor authentication involves two of the factors or it could involve all three factors or many more factors. As per the Payment Card Industry Data Security Standard (PCI DSS), references to two-factor authentication are replaced with multi-factor authentication. However, organizations can use two of the three factors to be in PCI compliance.

Overview

Various example embodiments of the present disclosure provide systems and methods for reducing online fraud in the multi-factor authentication (MFA) process for payment transactions. More specifically, techniques disclosed herein enable a server system to verify whether an authentication token (e.g., secure code, one-time password (OTP), etc.) received from a user device for completing a payment transaction is submitted by a genuine cardholder (i.e., owner of the payment instrument used for completion of the payment transaction) or not.

As noted above, in existing multi-factor authentication (MFA) systems, at least two or more authentication tokens (e.g., secure codes, one-time passwords (OTPs), etc.) need to be submitted to a payment server to complete the payment transaction. For example, a first authentication token may be received on a user device (e.g., mobile device) associated with the cardholder and a second authentication token may be received in an electronic mail on an electronic mail account associated with the cardholder. The electronic mail account may be accessed by the cardholder on another user device (e.g., laptop). In this scenario, the first authentication token is received on a first user device (i.e., mobile device, smartphone, etc.) and the second authentication token is received on a second user device (i.e., laptop, desktop, etc.).

In a first scenario, there is a possibility that SIM card inserted in the first user device (i.e., on which the first authentication token is received) may be cloned by the fraudster to perform the payment transaction (i.e., fraudulent transaction) with the payment instrument of the cardholder without consent of the cardholder. In a second scenario, there is a possibility that the electronic mail account of the cardholder (i.e., on which the second authentication token is received) is hacked or unethically accessed by the fraudster to perform the payment transaction (i.e., fraudulent transaction) with the payment instrument of the cardholder without consent of the cardholder, thereby leading to a dispute cycle.

To overcome such problems or limitations, the present disclosure describes a multi-factor fraud analyzer (i.e., server system) that is configured to perform real-time identification or authentication of the cardholder performing the multi-factor authentication (MFA) process to determine whether the genuine owner of the payment instrument (i.e., the cardholder) is approving the payment transaction or someone else (i.e., a hacker, fraudster, etc.).

At least one of the technical problems addressed by the present disclosure includes secure completion of MFA process for authentication of payment transactions between the cardholder and the merchant, irrespective of: (i) location of user devices from which the authentication tokens are received, and (ii) number of user devices associated from which the authentication tokens received to complete the MFA process.

In one embodiment, the server system is configured to receive a request in association with a payment transaction between a cardholder and a merchant. In one embodiment, the server system is a payment server associated with a payment network. In an example, the payment transaction may be performed online by accessing a merchant website associated with the merchant and entering a payment instrument (e.g., payment card, payment account, payment wallet, etc.) details to complete the payment transaction. In another example, the payment transaction may be performed offline by the cardholder on a payment terminal (e.g., automated teller machine (ATM), point-of-sale (POS) device, etc.) installed in a facility.

The request includes a cardholder identifier associated with the cardholder and information of successful verification of a user input entered by the cardholder for performing the multi-factor authentication (MFA). The cardholder identifier is used to verify the cardholder that initiated the payment transaction. To complete the payment transaction, the server system is configured to send a One-time-Password (OTP) through an email and/or a text message on one or more user devices from the plurality of registered user devices.

The server system is configured to identify user profile data stored in a database based, at least in part, on the cardholder identifier. The user profile data includes information of a plurality of registered user devices associated with the cardholder for the MFA. The information of the plurality of registered user devices in the user profile data includes a set of device authentication parameters associated with each user device of the plurality of registered user devices captured during the device registration process.

The set of device authentication parameters includes a Universally Unique Identifier (UUID) of the user device, hard-drive serial number of the user device, MachineGUID of the user device, media access control (MAC) address of the user device, dynamic host configuration protocol (DHCP), domain name system (DNS) data associated with the user device, and the like.

The server system is further configured to perform device behavioral analysis of one or more user devices from the plurality of registered user devices associated with the cardholder. In one embodiment, the one or more user devices are a subset of the plurality of registered user devices. In addition, the one or more user devices are those devices on which the one-time password is received through email and/or text message.

The server system is configured to monitor device activity status associated with the one or more user devices by capturing device behavioral characteristics of the one or more user devices. To capture device behavioral characteristics of the one or more user devices, the server system is configured to fetch the time of receipt of the OTP for the MFA on the one or more user devices through email and/or text message. In addition, the server system is configured to capture a read receipt flag in response to receiving the OTP on the one or more user devices. The read receipt flag is set when the cardholder reads the OTP on the one or more user devices through the email and/or the text message. Further, the server system is configured to capture the log-in status of the email account of the cardholder in the one or more user devices.

In response to determining zero user activity on the one or more user devices, the server system is configured to identify that a new user device associated with the cardholder is used for reading the OTP by the cardholder. The server system is configured to send an enrollment verification request to the plurality of registered user devices to enroll the new user device associated with the cardholder. The server system is further configured to receive user consent from at least one of the plurality of registered user devices for enrolling the new user device for the MFA. Furthermore, the server system is configured to capture a plurality of device authentication parameters associated with the new user device from the new user device. The server system is also configured to store the plurality of device authentication parameters into the user profile data of the cardholder.

The server system is configured to determine or calculate a device behavioral score based, at least in part, on the device activity status. The server system is configured to determine user activity on the user device based, at least in part, on the device activity status. In one example, the device activity status may represent online, offline, silent, no activity, and the like.

The server system is further configured to generate a multi-factor authentication (MFA) token associated with the payment transaction based, at least in part, on the device behavioral analysis. The server system is further configured to transmit the MFA token to the payment server for authorization of the payment transaction. In one embodiment, the server system is configured to receive an authentication request including the MFA token from an issuer server for validating the MFA token for the payment transaction. In response to the authentication request, the server system is configured to transmit an authentication response to the issuer server for determining approval or rejection of the payment transaction. In one embodiment, the determined device behavioral score is compared with a predetermined threshold value and upon determining that the device behavioral score is greater than the predetermined threshold value, the server system is configured to transmit the MFA token to the payment server.

Various embodiments of the present disclosure offer multiple technical advantages and technical effects. For instance, the present disclosure provides methods and systems for reducing fraud in the multi-factor authentication (MFA) process performed for authentication of the payment transactions. The security of the MFA process is improved by authenticating or verifying device behavior data of the user devices through which the two or more authentication tokens related to the MFA process are received. This authentication may be performed irrespective of the number of user devices associated with a cardholder or the location of the user devices from which the two or more authentication tokens are received. The present disclosure can be extended to all e-commerce transactions or cardholder to cardholder transactions with minor modifications. Further, the present disclosure enables to ensure cardholder stickiness to payment card transactions without resorting to other digital channels (e.g., UPI) or the use of cash.

The technical improvement in the online payment system as described herein is a computer-based solution to a technical deficiency or problem that is itself rooted in computer technology (e.g., the problem itself derives from the use of computer technology). More specifically, fraud is a significant problem for transactions conducted over an electronic payment network, especially for card-not-present transactions. Therefore, the present disclosure provides a consumer authentication system by analyzing device behavioral data of user devices of cardholders.

Various example embodiments of the present disclosure are described hereinafter with reference to FIGS. 1 to 10.

FIG. 1 illustrates an example representation of an environment 100 related to at least some embodiments of the present disclosure. Although the environment 100 is presented in one arrangement, other embodiments may include the parts of the environment 100 (or other parts) arranged otherwise depending on, for example, a multi-factor authentication (MFA) process with improved security. The environment 100 generally includes a cardholder 102 associated with a plurality of user devices 104a, 104b, 104c and 104d, a merchant 106, a server system 108, an acquirer server 112, an issuer server 114, a payment network 116 including a payment server 118, each coupled to, and in communication with a network 110. The network 110 may include, without limitation, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among two or more of the parts illustrated in FIG. 1, or any combination thereof.

Various entities in the environment 100 may connect to the network 110 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, future communication protocols or any combination thereof. For example, the network 110 may include multiple different networks, such as a private network made accessible by the server system 108 and a public network (e.g., the Internet) through which the server system 108 may communicate.

In one example, the cardholder 102 may be an individual, representative of a corporate entity, non-profit organization, or any other person. More specifically, the cardholder 102 may be any individual buyer and/or customer, or any other person that is presenting a payment instrument (e.g., payment card, payment account, payment wallet, etc.) during a payment transaction to a merchant representative or other seller or via an online interface associated with the merchant 106. In an example, the cardholder 102 may have a payment instrument (e.g., a payment card) issued by an issuing bank (e.g., the issuer server 114) and may be provided with the payment card with financial or other account information encoded onto the payment card.

Examples of the plurality of user devices 104a-104d may be a smartphone, a tablet, a laptop, a phablet, a personal digital assistant (PDA), a smartwatch, a computer system, a voice-activated assistant, a Virtual Reality (VR) device, or any computing device. In one example, the user device 104a may be installed with a commercial payment application. Examples of commercial payment applications include merchant applications associated with a merchant (e.g., the merchant 106) and a digital wallet application associated with a wallet service provider. The user device 104a may be installed with the commercial payment application that is configured to integrate various APIs for performing payment transactions with the merchant 106. The term "commercial payment application" is used broadly to include any software program(s) capable of implementing the features described herein.

In some embodiments, the commercial payment application may include any API, service, application, applet, or other executable code suitable to retrieve payment information from a secure element, generate payment information (e.g., a dynamic value, etc.) for a payment transaction, and communicate with a server system application, merchant application, wallet service provider application, mobile gateway, and/or any other application in order to securely communicate with a server computer (e.g., remote key manager, mobile gateway, payment processing network, third-party service provider, etc.). The commercial payment application may include or be configured to obtain various device parameters and stored information including cardholder private key, payment credentials, third party keys, mobile gateway credentials, and may be capable of communicating with an issuer to obtain issuer updates.

In some embodiments, the plurality of user devices 104a-104d may run on operating systems such as a Mac OS® environment (Mac OS is a registered trademark of Apple Inc. located in Cupertino, CA), Android® OS (Android is a registered trademark of Google, Inc. of Mountain View, CA), etc.

In one embodiment, the issuer server 114 is a financial institution that manages accounts of multiple users. Account details of the accounts established with the issuer bank are stored in PAN profiles of the users such as cardholder 102 in a memory of the issuer server 114 or on a cloud server associated with the issuer server 114. The terms "issuer server", "issuer", or "issuing bank" will be used interchangeably herein. The issuer server 114 provides various services to cardholders such as enabling a multi-factor authentication process for performing payment transactions. In one embodiment, the issuer server 114 may enable the multi-factor authentication for the payment account of the cardholder 102 on a default basis. The issuer server 114 also provides a user interface to the cardholder 102 to select a mode of communication (such as SMS, email, phone call, or any messaging application, etc.) to perform the user authentication. Hence, the payment account of the cardholder 102 is enrolled for the 3D secure messaging protocol. According to the 3D secure messaging protocol, an access control server (ACS) 120 is installed in the issuer domain. Each issuer is required to maintain an ACS which is used to support cardholder authentication. In one embodiment, the ACS 120 is Payment Card Industry (PCI) compliant. The ACS 120 may be deployed by the issuer associated with the issuer server 114. Alternatively, the issuer server 114 can outsource the ACS 120 to a third-party or the payment network 116.

In one embodiment, the merchant 106 represents the authorized acceptor of payment cards for payments for goods/services sold by the merchant 106 and is associated with the acquirer server 112. In one embodiment, the acquirer server 112 is associated with a financial institution (e.g., a bank) that processes financial transactions. This can be an institution that facilitates the processing of payment transactions for physical stores, ATM terminals, merchants, or an institution that owns platforms that make online purchases or purchases made via software applications possible (e.g., shopping cart platform providers and in-app payment processing providers). The terms "acquirer", "acquirer bank", "acquiring bank" or "acquirer server" will be used interchangeably herein.

In one embodiment, the payment network 116 may be used by the payment card issuing authorities as a payment interchange network. The payment network 116 may include a plurality of payment servers such as the payment server 118. Examples of payment interchange networks include, but are not limited to, Mastercard® payment system interchange network. The Mastercard® payment system interchange network is a proprietary communications standard promulgated by Mastercard International Incorporated® for the exchange of financial transactions among a plurality of financial activities that are members of Mastercard International Incorporated®. (Mastercard is a registered trademark of Mastercard International Incorporated located in Purchase, N.Y.)

In one non-limiting example, to initiate a payment transaction, the cardholder (i.e., the cardholder 102) may open a merchant application operated by the merchant 106 on the user device 104a and initiate the payment transaction with the merchant 106. The user device 104a reads the payment card information entered by the cardholder 102 and extracts merchant account information to generate a payment authorization request message. The payment authorization request message typically includes the payment card account number, the amount of the transaction, and other information, such as merchant identification and location. The payment authorization request message is sent to the payment server 118 associated with the payment network 116 that routes a request for performing the MFA process to the ACS 120 associated with the issuer server 114 that issued the cardholder's payment card. The ACS 120 sends a One-time Password (OTP) to a registered mobile number and/or an email ID of the cardholder 102 after validating first-factor authentication data received from the cardholder 102. Apart from the OTP, the ACS 120 is capable of authenticating a static password, a combination of static password and dynamic password, biometric authentication, and the like.

Upon successful authentication, the issuer server 114 performs an authorization process and transfers transaction amount to the merchant's account based on a result of the authorization process.

In some scenarios (not in accordance with the present disclosure), it may be possible that a fraudster may have cloned SIM card inserted in the user device 104a of the cardholder 102 or the fraudster has hacked the email (i.e., electronic-mail) account of the cardholder 102. In such cases, the fraudster can access the authentication factors sent to the user device 104a of the cardholder 102 while performing the MFA process of payment transactions, thereby fraudulent transactions can occur from the payment account of the cardholder 102.

Further, in some scenarios (not in accordance with the present disclosure), it may also be possible that the cardholder 102 performing a payment transaction using the user device 104a reads secure code or OTP on another user device (for example, user device 104b) of the cardholder 102 since cardholder's email is also configured in user device 104b. Therefore, when the cardholder 102 enters the secure code from his/her user device 104a or laptop or any other connected devices, it cannot be identified whether it's actually the cardholder 102 who is approving or feeding the secure code or someone else. Therefore, there is a need not only to perform the MFA process but also, to verify that the authentication factors (e.g., security tokens, OTPs, etc.) are received from a user device 104a that actually belongs to the cardholder 102. In other words, the authentication of the user device 104a from which the authentication factors are received needs to be performed.

To validate that the authentication factors (i.e., secure tokens, OTPs, etc.) are received from genuine user devices belonging to the cardholder 102, the present disclosure introduces the server system 108 i.e., a multi-factor device analyzer module. In one embodiment, the server system 108 is configured to perform one or more operations described herein. The server system 108 is configured in a manner (described in connection with the next set of figures) that creates a series of device checks and actions performed on user devices of the cardholder 102 to authenticate the payment transaction.

The server system 108 is a separate part of the environment 100, and may operate apart from (but still in communication with, for example, via the network 110) the payment server 118, the issuer server 114, the acquirer server 112, and any third-party external servers (to access data to perform the various operations described herein). However, in other embodiments, the server system 108 may actually be incorporated, in whole or in part, into one or more parts of the environment 100, for example, the payment server 118, the issuer server 114, or the acquirer server 112. In addition, the server system 108 should be understood to be embodied in at least one computing device in communication with the network 110, which may be specifically configured, via executable instructions, to perform as described herein, and/or embodied in at least one non-transitory computer-readable media. In one embodiment, the server system 108 is connected with a database 122.

In one embodiment, the server system 108 is configured to provide a user interface (UI) to the cardholder 102 to register the user device 104a for device behavioral analyzer service to facilitate more secure payment transactions in MFA methods. The server system 108 is configured to send a consent request on the user device 104a for accessing a set of device authentication parameters associated with the user device 104a. Upon approving the consent request, the server system 108 is configured to interact with the operating system installed in the user device 104a to analyze various device activity data. The server system 108 is configured to receive a set of device authentication parameters associated with the user device 104a.

The set of device authentication parameters associated with the user device 104a may include, but is not limited to, universally unique identifier (UUID) value, media access control (MAC) address, International Mobile Equipment Identity (IMEI) number, hard-drive serial number, machine GUID, dynamic host configuration protocol (DHCP) value, domain name system (DNS) value, etc. In general, UUID is a universally unique identifier generated using a timestamp and MAC address of the computer system on which it is generated. The machine GUID value is the unique identifier for each client machine. The MAC address is a unique identifier that is hardwired or hard coded onto a network interface controller (NIC) of user devices (e.g., the user device 104e) for use as a network address in communications within a network segment (e.g., the network 110). The DHCP is a network management protocol used on Internet Protocol (IP) networks for automatically assigning IP addresses and other communication parameters to devices connected to a network (e.g., the network 110) using a client-server architecture. In general, DNS is a hierarchical and decentralized naming system for computers, services, or other resources connected to the internet. The set of device authentication parameters may further include phone number, an integrated circuit card identifier (ICCID), an electronic serial number (ESN), a mobile equipment identifier (MEID), user identity module identifier (UIMID), an international mobile subscriber identity (IMSI), a uniform resource identifier (URI), an electronic numbering domain (ENUM), or the like.

In one embodiment, the server system 108 is configured to store the set of device authentication parameters in user profile data corresponding to the cardholder 102 for the user device 104a in the database 122. The user profile data may include cardholder-user device mapping storing values of a set of device authentication parameters captured during the device registration process and behavioral pattern data associated with the cardholder 102.

Similarly, the cardholder 102 can also register user devices 104b and 104c by capturing the set of device authentication parameters, respectively. The server system 108 is configured to update the user profile data of the cardholder 102 by storing the set of device authentication parameters of the user devices 104b and 104c corresponding to the cardholder 102 in the database 122. In one embodiment, the server system 108 is configured to retrieve the set of device authentication parameters for the registered user device 104a by running a query with a combination of identifiers of the cardholder 102 and the user device 104a.

In one embodiment, the server system 108 is configured to enable a read receipt flag on the plurality of registered user devices 104a-104c. The read receipt flag is enabled to inform the server system 108 that the OTP has been read by the cardholder 102 or not.

The number and arrangement of systems, devices, and/or networks shown in FIG. 1 are provided as an example. There may be additional systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2A:
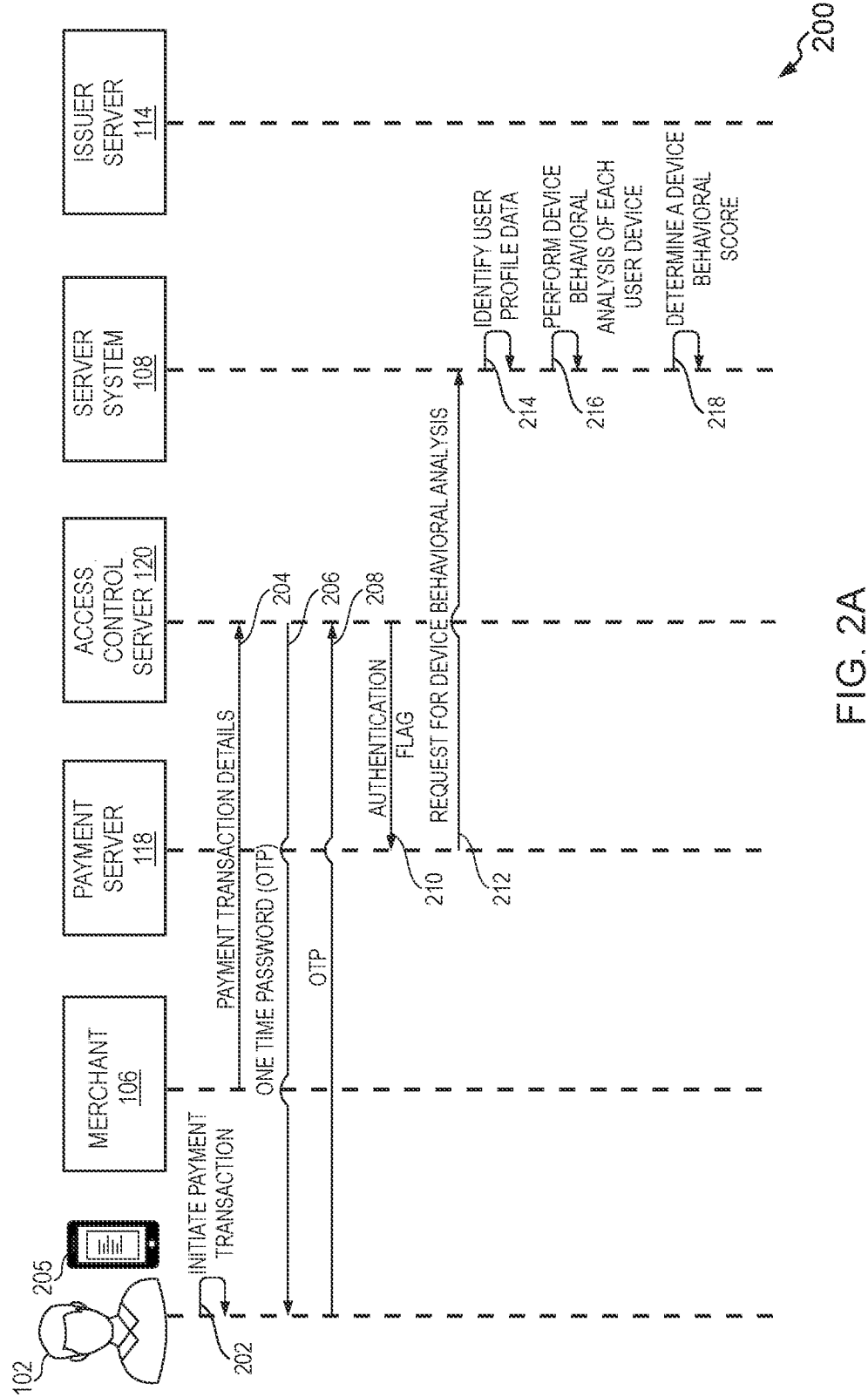
FIGS. 2A and 2B, collectively, represent a sequence flow diagram of a process flow for analyzing device behavior data of user devices of a cardholder during multi-factor authentication (MFA) process of a payment transaction, in accordance with an embodiment of the present disclosure.
Figure 2B:
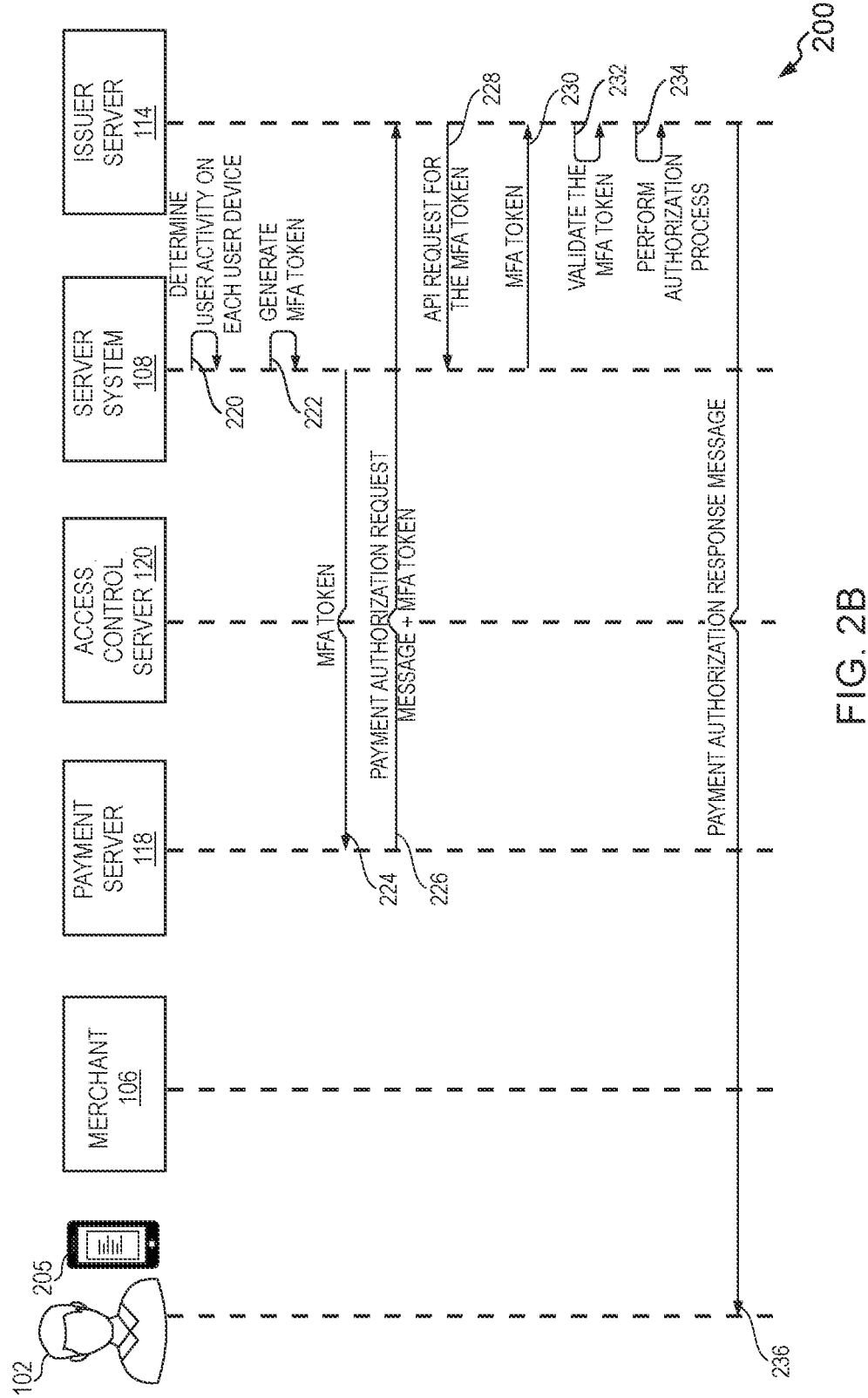

FIGS. 2A and 2B, collectively, represent a sequence flow diagram 200 of a process flow for analyzing device behavior data of user devices of the cardholder 102 during the multi-factor authentication (MFA) process of a payment transaction, in accordance with an embodiment of the present disclosure. The sequence of operations of the sequence flow diagram 200 may not be necessarily executed in the same order as they are presented. Further, one or more operations may be grouped together and performed in form of a single step, or one operation may have several sub-steps that may be performed in parallel or in a sequential manner. It is to be noted that to explain the sequence flow diagram 200, references may be made to elements described in FIG. 1.

As stated above, to avail services/goods offered by the merchant 106, the cardholder 102 needs to perform the payment transaction or provide a financial asset (e.g., monetary payment) to the merchant 106. In an embodiment, the cardholder 102 has an option to perform the payment transaction online, by accessing the merchant website associated with the merchant 106 on a web browser installed in a user device (e.g., the user device 205) and entering details of the payment instrument (e.g., payment card, payment account, payment wallet, etc.) in a secure web page to conduct the payment transaction. In another embodiment, the cardholder 102 has an option to perform the payment transaction via wallet applications.

At 202, the cardholder 102 initiates the payment transaction at the merchant 106. In one embodiment, the cardholder 102 may perform the payment transaction by accessing a merchant application or merchant website on a web browser installed in the user device 205. To perform the payment transaction, the cardholder 102 needs to provide a correct username and associated secure password as first-factor authentication to log into an account of the cardholder 102 stored at the merchant website. After successful login, the cardholder 102 may perform the payment transaction by entering details of the payment instrument (e.g., payment card, payment wallet, etc.) in the merchant application or on the merchant website. Alternatively, the cardholder 102 may perform a card-on-file transaction without entering details of the payment instrument. In general, a card-on-file transaction is a transaction where a cardholder (e.g., the cardholder 102) authorized a merchant (e.g., the merchant 106) to store payment card details of the cardholder 102.

At 204, the merchant 106 transmits the payment transaction details to the ACS 120 via the payment server 118 for the multi-factor authentication.

At 206, the ACS 120 sends an additional factor of authentication (for example, OTP, fingerprint scan, facial identification, etc.) to the contact information of the cardholder 102. For example, the cardholder 102 may have logged in his email via a browser running on the user device 205 (for example, desktop computer) on which he may be able to receive the email and access the OTP. Alternatively, the cardholder 102 may be able to read the OTP sent from the ACS 120 in the SMS application and/or the email application installed in the user device 104a as well.

At 208, the ACS 120 receives OTP entered by the cardholder 102 and verifies the OTP entered by the cardholder 102 by matching the OTP that was sent. In case, if the ACS 120 could not verify the OTP entered by the cardholder 102, the ACS 120 sends an authentication flag to the payment server 118 to decline the payment transaction.

When the OTP entered by the cardholder 102 is verified, at 210, the ACS 120 sends an authentication flag to the payment server 118 indicating the successful verification of a user input (e.g., OTP) entered by the cardholder 102 on the user device 205 for performing the MFA of the payment transaction.

At 212, the payment server 118 sends a request (for example, API call) to the server system 108 for device behavioral analyzer service. The request includes, but is not limited to, cardholder identifier, information of successful verification of a user input (e.g., OTP) entered by the cardholder 102 on the user device 205 for performing the MFA of the payment transaction, device details of the user device 205, transaction details (for example, merchant identifier, transaction identifier), etc.

In one embodiment, upon intercepting the request, the server system 108 checks whether the user device 205 is registered for device behavior analyzer service or not. The server system 108 may capture one or more device parameters (e.g., MAC address, IMEI number, etc.) associated with the user device 205 to determine whether the user device 205 is a new user device or already registered for device behavior analyzer service.

At 214, the server system 108 identifies user profile data corresponding to the cardholder 102 from the database 122. In one embodiment, the server system 108 sends a query request to the database 122 for accessing the user profile data based on the cardholder identifier. The user profile data includes, but is not limited to, information of a plurality of registered user devices (for example, the user devices 104a-104c) associated with the cardholder 102 that have already been registered for the device behavior analyzer service for the MFA by the cardholder 102. The information of the plurality of registered user devices includes a set of device authentication parameters that were captured during the device registration process.

At 216, the server system 108 performs device behavioral analysis of each user device of the plurality of registered user devices 104a-104c for the cardholder 102. In one embodiment, the server system 108 may perform the device behavioral analysis of one or more registered user devices (for example, user devices 104a and 104b) which have logged in cardholder's email account in the email application or the browser and/or have received the OTP via SMS application.

In one embodiment, the server system 108 transmits a request to perform the device behavioral analysis for the one or more user devices of the plurality of user devices 104a-104d of the cardholder 102. In other words, the server system 108 triggers an API to connect to the user devices 104a and 104b for performing the device behavioral analysis. To perform the device behavioral analysis, the server system 108 is configured to perform various checks and actions. For example, the server system 108 is configured to determine the device activity status of the one or more user devices 104a and 104b by capturing the device behavioral characteristics of respective user devices. The device behavioral characteristics that may be captured may include device behavioral parameters such as but are not limited to, (a) time of receiving One-time Password (OTP) for the MFA on the user device through an email and/or a text message, (b) a read receipt flag in response to receiving One-time Password (OTP) on the user device, and (c) log-in status of the email account of the cardholder 102 in the user device. The read receipt flag is set when the cardholder 102 reads the OTP on the user device through the email application and/or SMS application.

In one embodiment, the device behavioral parameters may be different for different user devices. In other words, the device behavioral parameters are configurable for each user device. Thus, the device activity status of each user device is unique and different from other user devices.

In one embodiment, the server system 108 determines a device behavioral score corresponding to each user device based on its associated device activity status.

For example, a cardholder "A" owns a laptop and a mobile phone that have already been registered for device behavior analyzer service during the MFA of the payment transaction. Now, when the cardholder "A" performs a payment transaction in a web browser on his laptop device, an OTP is sent as an SMS text message on a mobile phone, and the same or different OTP is also sent as an email on an email's account of the cardholder "A". In such cases, there might be multiple scenarios that can happen for completing the payment transaction like (1) the cardholder "A" reads the OTP from the text message on the mobile phone and enters the same on the laptop, (2) the cardholder "A" reads the OTP from the email logged in an email application installed in the mobile phone and enters the OTP on the laptop, or (3) the cardholder "A" accesses the email on the laptop for the OTP and enters the OTP on the laptop. In all such scenarios, the server system 108 may detect the user activity either on the mobile phone or the laptop. Since the device and user activity in all the above scenarios are different, therefore, the server system 108 may calculate different device behavioral scores corresponding to all such scenarios. It may be possible that accessing the email on the laptop for the OTP and entering the OTP on the laptop may be given as the highest device behavioral score for the laptop among all the scenarios.

While sending the OTP on the email application and the SMS application installed on the registered user devices, the OTP message may contain a read-receipt request flag in a message header that has been set by the ACS 120 or the server system 108 to request a read receipt flag. At some time either concurrent to or subsequent to the generation of an acknowledgment, the registered user devices 104a-104c may generate a read receipt message and transmit it to the server system 108. In this manner, the server system 108 may determine the user device (e.g., the plurality of registered user devices 104a-104c) on which the sent OTP was read (or at least displayed).

At 218, the server system 108 determines a device behavioral score corresponding to each user device of the plurality of registered user devices 104a-104c based on the device behavioral analysis.

In one embodiment, the server system 108 also interacts with the operating systems of each user device of the plurality of registered user devices 104a-104c for performing dark mode monitoring of the plurality of registered user devices 104-104c. The dark mode monitoring is performed based, at least in part, on a plurality of factors. The plurality of factors includes application usage statistics of the plurality of registered user devices 104a104c, battery status of the plurality of registered user devices 104a-104c, network connection strength of the plurality of registered user devices 104a-104c, and the like. The server system 108 is also configured to calculate a dark mode monitoring score based, at least in part, on the dark mode monitoring of the plurality of registered user devices 104a-104c.

In some embodiments, the server system 108 utilizes the dark mode monitoring score along with the device behavioral score to determine a device behavioral flag in the MFA token. The dark mode monitoring is performed for identifying anomalies in the usage pattern of the plurality of registered user devices 104a-104c of the cardholder 102. The identification of anomalies in the usage pattern further facilitates in determining whether a genuine user (i.e., the cardholder 102) is using the plurality of registered user devices 104a-104c or not.

At 220, the server system 108 determines user activity on each user device based, at least in part, on the read receipt flag.

In response to determining that the OTP was read on a registered user device (i.e., user activity is detected on the registered user device) at 222, the server system 108 generates a multi-factor authentication token. The MFA token is generated based on the device behavioral analysis of the plurality of registered user devices 104a-104c of the cardholder 102. In one embodiment, when there is no user activity detected on the registered user devices, it means that the OTP was read from a new user device. Detailed explanation corresponding to the embodiment is provided with reference to the FIG. 3.

At 224, the server system 108 sends the MFA token to the payment server 118.

At 226, the payment server 118 sends a payment authorization request message including the MFA token to the issuer server 114 of the cardholder 102 for payment authorization. In one embodiment, the authentication request transmits the MFA token in a data element (DE) field. In one embodiment, the payment authorization request message may comply with a message type defined by an International Organization for Standardization (ISO) 8583 standard, which is a standard for systems that exchanges electronic transaction information associated with payments. In one example, an ISO 8583 transaction message may include one or more data elements that store data usable by the issuer server 114 to communicate information such as transaction requests, responses to transaction requests, inquiries, indications of fraud, security information, or the like.

At 228, the issuer server 114 sends an API request for accessing the MFA token from the server system 108. At 230, the server system 108 sends the MFA token to the issuer server 114 in response to the API request. In general, API is an intermediary or a set of protocols and definitions that allows two computer programs or computers to connect to or talk to each other.

At 232, the issuer server 114 validates the MFA token received along with the payment authorization request message from the payment server 118 by comparing the MFA token received from the server system 108. If the server system 108 fails to validate the MFA token received from the issuer server 114, the authentication response determines the rejection of the payment transaction.

At 234, the issuer server 114 performs the authorization process known in the art to deduct or debit the payment amount from the payment account of the cardholder 102 and credit the payment amount in the payment account of the merchant 106, if appropriate funds are present in the payment account of the cardholder 102.

At 236, the issuer server 114 transmits a payment authorization response message (i.e., payment success/accepted, or payment failure/declined) to the user device 205. In one embodiment, the issuer server 114 transmits a payment authorization response message (i.e., payment success/accepted, or payment failure/declined) to the payment server 118 via the server system 108.

Figure 3:
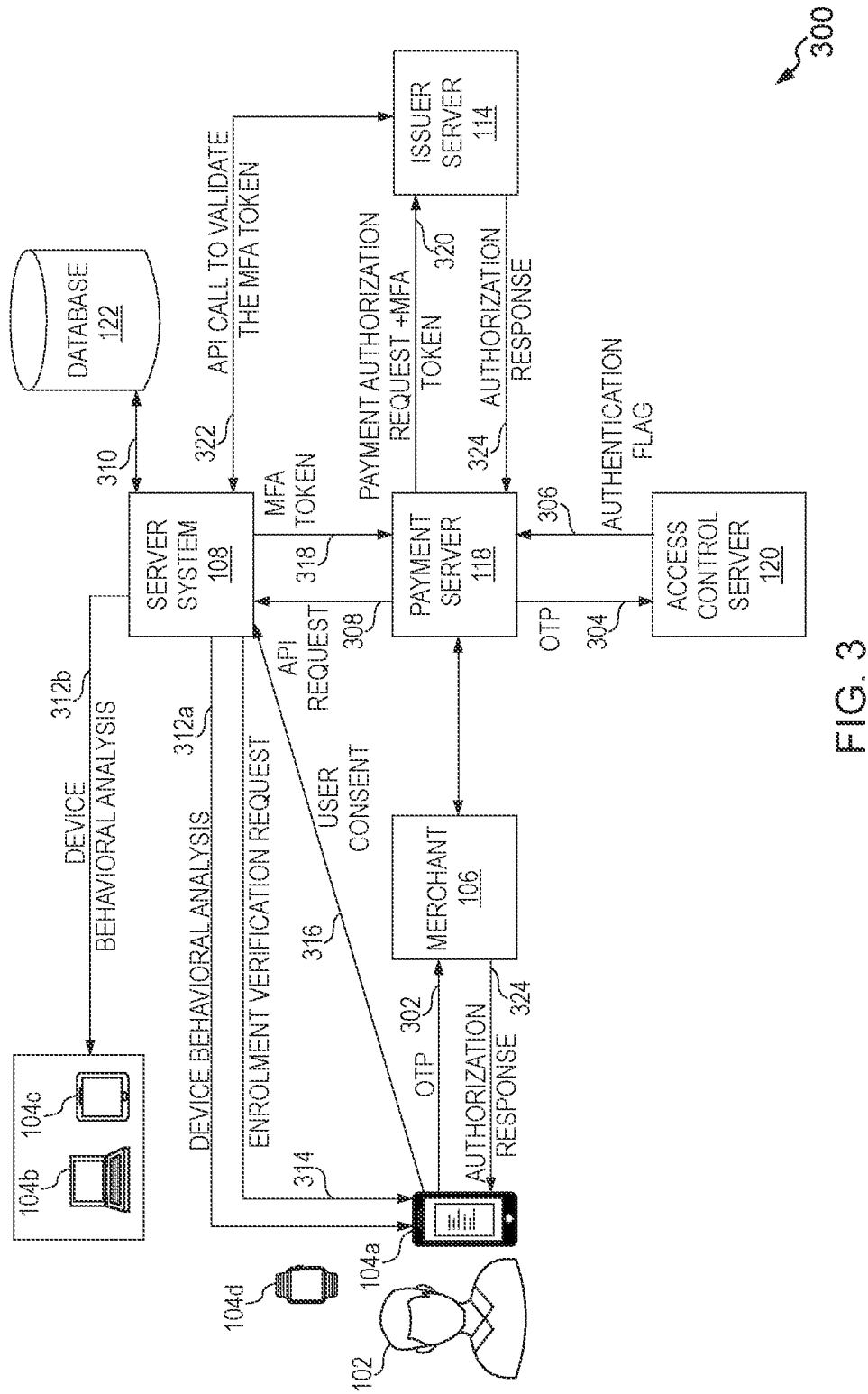
FIG. 3 is an example representation of a process flow of analyzing device behavioral data of user devices in MFA process, in accordance with another embodiment of the present disclosure.

FIG. 3 is an example representation 300 of a process flow of analyzing device behavioral data in the MFA process, in accordance with an embodiment of the present disclosure. As mentioned earlier, when the cardholder 102 wants to make a payment transaction on a merchant website of the merchant 106, the cardholder 102 enters payment card details and other transaction details on a user interface of the merchant website. The merchant 106 sends the payment transaction details to the payment server 118. The payment server 118 sends the payment transaction details to the ACS 120 associated with the issuer server 114 to perform the MFA for the payment transaction. The ACS 120 generates an OTP message that is enabled with a read-receipt request flag and sends the OTP message to the associated email account of cardholder 102 and/or text message on the registered mobile phone number of the cardholder 102.

To perform the MFA, the cardholder 102 enters the OTP and then, the cardholder 102 submits the payment transaction to the merchant 106 (see, 302). The merchant 106 forwards the OTP to the payment server 118 that transmits the entered OTP by the cardholder 102 to the ACS 120 (see, 304). Upon successful verification of the OTP entered by the cardholder 102, the ACS 120 sends an authentication flag indicating the successful verification of the OTP entered by the cardholder 102 for the MFA of the payment transaction, to the payment server 118 (see, 306). The payment server 118 triggers an API request for device behavior analyzer service to the server system 108 for the payment transaction (see, 308). The server system 108 checks whether the cardholder 102 has opted for the device behavior analyzer service for the MFA earlier or not. If the device behavior analyzer service is opted-in by the cardholder 102, the server system 108 accesses information of the plurality of registered user devices 104a-104c of the cardholder 102 for device behavior analyzer service from the database 122 (see, 310). The information of the plurality of registered user devices 104a-104c includes connection details of establishing API session with each user device and a set of device authentication parameters corresponding to each user device.

Thereafter, the server system 108 sends API requests or calls to each user device of a plurality of registered user devices 104a-104c to perform device behavioral analysis (see, 312a and 312b). A detailed explanation of performing the device behavioral analysis is provided with reference to the FIGS. 5A-5B. Therefore, for the sake of brevity, a detailed explanation of performing the device behavioral analysis is omitted herein.

In one example, the cardholder 102 reads the OTP from the email logged in the new user device (e.g., the user device 104d) that is not registered for the device behavioral analysis. In other words, the cardholder 102 is performing a payment transaction from his user device 104a and is reading for 2nd-factor secure code from email logged in another user device (e.g., the user device 104d), which is a new device and not yet registered in the user profile. Therefore, the server system 108 detects zero user activity on the plurality of registered user devices 104a-104c during the MFA process. Since the new user device 104d is not a trusted device, therefore, the server system 108 sends an enrolment verification request to the cardholder 102 on the user device 104a which is already been registered (see, 314). The enrolment verification request provides information to the cardholder 102 that the new user device 104d was used to read the second-factor authentication (i.e., OTP), therefore, it is requested to give consent to enroll the new user device 104d for device behavior analyzer service during the MFA process. In response, the user device 104a sends the user consent to the server system 108. In one scenario, if the cardholder 102 provides the user consent not to enroll the new user device 104d, the server system 108 may send a notification to the issuer server 114 to decline the payment transaction, thereby fraudulent transactions are blocked within the MFA process. A detailed explanation of enrolling a new user device 104d during a payment transaction is explained herein with reference to FIG. 4, and therefore, it is not reiterated for the sake of brevity.

In one embodiment, the server system 108 generates MFA token based, at least in part, on device behavioral analysis and transmits to the payment server 118 (see, 318). The MFA token includes a plurality of data fields such as (a) transaction identifier, (b) merchant identifier, (c) device behavior analyzer service opt-in flag, (d) new device detection flag, (e) device behavioral flag, and (f) device activity status flag. An exemplary representation of the MFA token is shown as below:

```
{ "TxnId": "1561533871082",
  "merchantId": "some_merchant_id",
  "AnalyzerService": "Opted/NotOpted"
  "newDevice": "NotFound/Found",
    "DeviceBehavior": "True/False",
  "DeviceActivity": "Active/InActive" }
```

In one embodiment, the device behavior analyzer service opt-in flag is set when the cardholder 102 has registered one or more user devices (e.g., the user devices 104a and 104b) for device behavior analyzer service to facilitate more secure payment transactions in MFA methods. In one embodiment, if the server system 108 intercepts no user activity on the plurality of registered user devices 104a-104c and no new user device is identified for reading the OTP, the server system 108 may update the status of "DeviceActivity" to 'Inactive' in the MFA token. In one example, the device behavioral flag may be a score value under a particular range according to the issuer's choice.

Thereafter, the payment server 118 sends a payment authorization request message and the MFA token to the issuer server 114 (see, 320). To validate the MFA token received from the payment server 118, the issuer server 114 also sends an API call to the server system 108 to receive the MFA token (see, 322), thus, an additional layer of security is implemented. In one example, when the device behavioral flag is set as false in the MFA token, the issuer server 114 declines the payment transaction.

In the end, the issuer server 114 performs the payment authorization process and sends a payment authorization response to the user device 104a of the cardholder 102 (see, 324).

Figure 4:
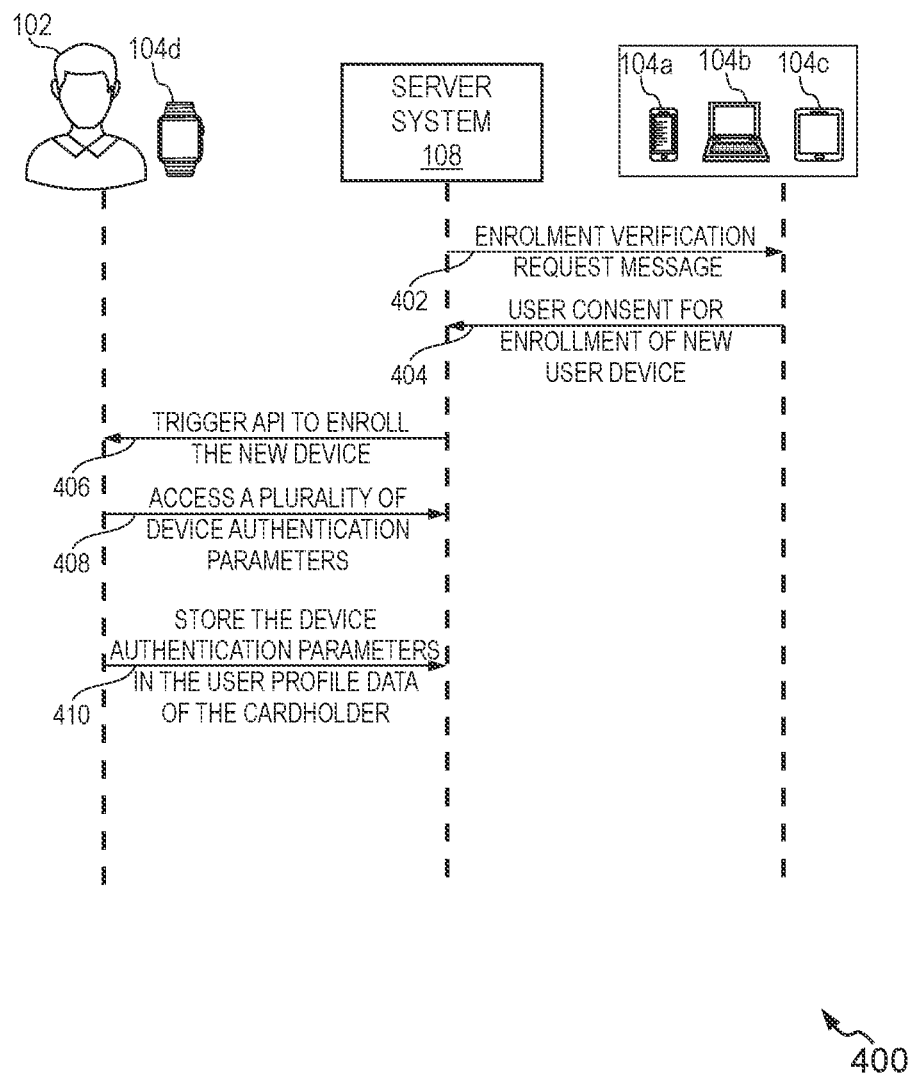
FIG. 4 represents a sequence flow diagram of a process flow for performing real-time enrolment of the new user device for device behavior analyzer service during the payment transaction, in accordance with an embodiment of the present disclosure.

FIG. 4 represents a sequence flow diagram 400 of a process flow for performing real-time enrolment of the new user device (i.e., the user device 104d) for device behavior analyzer service during the payment transaction, in accordance with an embodiment of the present disclosure. The sequence of operations of the sequence flow diagram 400 may not be necessarily executed in the same order as they are presented. Further, one or more operations may be grouped together and performed in form of a single step, or one operation may have several sub-steps that may be performed in parallel or in a sequential manner. It is to be noted that to explain the sequence flow diagram 400, references may be made to elements described in FIG. 1. The sequence flow diagram 400 explains the process flow when the server system 108 sends the enrollment verification request to the plurality of registered user devices 104a-104c to enroll the new user device 104d in the user profile of the cardholder 102.

The sequence flow diagram 400 is explained herewith including entities such as the user device 104d, the plurality of registered user devices 104a-104c, and the server system 108.

At 402, the server system 108 may send the enrollment verification request message to at least one of the plurality of registered user devices 104a-104c of the cardholder 102. In one embodiment, the server system 108 may send the enrollment verification request message on the plurality of registered user devices 104a-104c through one or more modes of communication (e.g., email, text message, etc.). The enrollment verification request message includes an enrollment link and an enrollment request token.

In an example, the server system 108 may send the enrollment verification request message through the text message (i.e., short messaging service (SMS)) on at least one of the plurality of registered user devices 104a-104c of the cardholder 102. In another example, the server system 108 may send the enrollment verification request message through email on at least one of the plurality of registered user devices 104a-104c of the cardholder 102. The enrollment link may contain a hyperlink to a web page, on which an enrollment response token in response to the enrollment request token needs to be entered by the cardholder 102 to provide the consent to enroll the user device 104d along with the plurality of registered user devices 104a-104c. In one embodiment, the enrollment request message may include a secure token, OTP, biometric authentication request (e.g., facial identifier, fingerprint scan, etc.), and the like.

At 404, the server system 108 may receive the user consent for enrollment of the new user device 104d. The user consent is provided if the cardholder 102 provides the correct enrollment response message in response to the enrollment request message from at least one of the plurality of registered user devices 104a-104c. In one example, the cardholder 102 may click/press/tap on the enrollment link on at least one of the plurality of registered user devices 104a-104c. Upon clicking on the enrollment link, a web page may open in a web browser installed in the user device 104b, asking for the enrollment response message in response to the enrolment request message from the cardholder 102. In one embodiment, the enrolment response message may include the secure token, OTP, biometric authentication response (e.g., facial identifier, fingerprint scan, etc.), and the like. The cardholder 102 may further enter or input the enrollment response token on the web page through a keyboard, on-screen keyboard, touch screen panel, voice command, and the like.

If the enrollment response message entered by the cardholder 102 is correct, then, the server system 108 determines the consent of the cardholder 102 to register the user device 104d with the plurality of registered user devices 104a-104c in the user profile of the cardholder 102 stored in the database 122. If the enrollment response message entered by the cardholder 102 is incorrect, then the server system 108 may again send the enrollment verification request on at least one of the plurality of registered user devices 104a-104c.

Upon determining the user consent for enrollment of the user device 104d, at 406, the server system 108 may trigger an API to enroll the user device 104d for device behavior analyzer service.

At 408, the server system 108 may access a plurality of device authentication parameters associated with the user device 104d for uniquely identifying the user device 104d of the cardholder 102. The plurality of device authentication parameters may include device universally unique identifier (UUID), hard drive serial number, MachineGUID, media access control (MAC) address, dynamic host configuration protocol (DHCP) data, domain name system (DNS) data, and the like.

At 410, the server system 108 stores the plurality of device authentication parameters for the user device 104*d* in the user profile data of the cardholder 102.

Figure 5A:
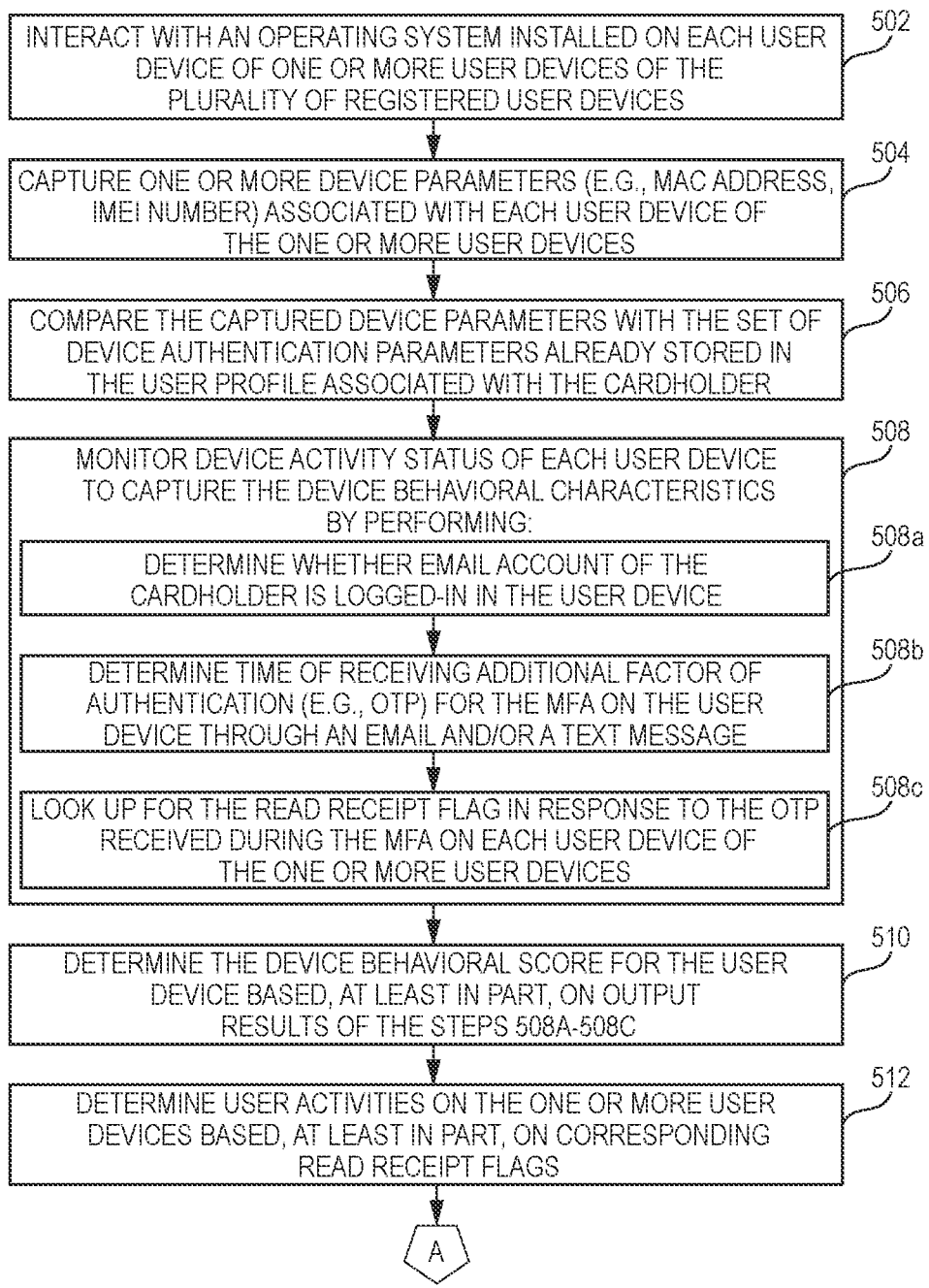
FIGS. 5A and 5B, collectively, represent a flow chart for performing device behavioral analysis of one or more registered user devices associated with a cardholder during the payment transaction, in accordance with an embodiment of the present disclosure.
Figure 5B:
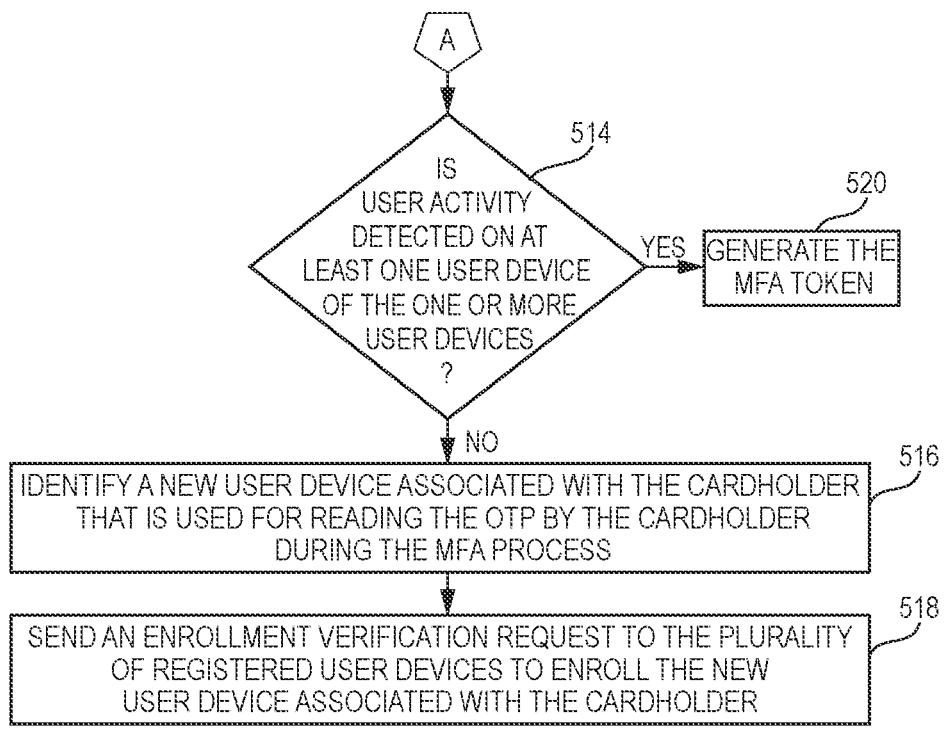

FIGS. 5A-5B, collectively, represents a flow chart 500 for performing device behavioral analysis of one or more registered user devices 104*a*-104*c* associated with the cardholder 102 during the payment transaction, in accordance with an embodiment of the present disclosure. The sequence of operations of the flow chart 500 may not be necessarily executed in the same order as they are presented. Further, one or more operations may be grouped together and performed in form of a single step, or one operation may have several sub-steps that may be performed in parallel or in a sequential manner. It is to be noted that to explain the flow chart 500, references may be made to elements described in FIG. 1.

The flow chart 500 explains the process of device behavioral analysis to determine device behavior and user activity on the registered user devices 104*a*-104*c* when the cardholder 102 successfully completes the MFA for the payment transaction and the ACS 120 sends an authentication flag to the payment server 118 indicating a successful verification of the user input entered by the cardholder 102.

At 502, the server system 108 interacts with an operating system (e.g., Android, iOS, Symbian, etc.) installed on each user device of the one or more user devices of the plurality of registered user devices 104*a*-104*c*. In one embodiment, the server system 108 may also interact with a user device that initiates the payment transaction and check whether the user device is present in the user profile data or not. In case if the user device is not enrolled for the device behavior analyzer service, the server system 108 may send an enrollment request to registered user devices according to the process flow as mentioned in the FIG. 4.

At 504, the server system 108 captures one or more device parameters (e.g., MAC address, IMEI number) associated with each user device. The one or more parameters are unique parameters being captured for identification of the user device.

At 506, the server system 108 compares the captured one or more device parameters with the set of device authentication parameters already stored in the user profile data associated with the cardholder 102.

At 508, the server system 108 monitors the device activity status of each user device to capture the device behavioral characteristics by performing the following steps 508*a*-508*c*. In particular, the server system 108 sends a device behavior check API to the user device, which is mapped to the user profile data.

At 508*a*, the server system 108 checks whether the email account of the cardholder 102 is logged-in in the user device or not. In particular, the server system 108 captures email parameters via API is gmail enabled( ) and validation login audit log( ) parameters.

At 508*b*, the server system 108 determines the time of receiving the additional factor of authentication (e.g., One-time Password (OTP)) for the MFA on the user device through an email and/or a text message. To determine the time of receipt of the OTP through an email and/or an SMS text message, the server system 108 calls an API call for "NotificationListenerService" class on the user device. In general, the "NotificationListenerService" is an API service that receives calls from the user device when new notifications are posted or removed, or their ranking gets changed. In addition, the server system 108 calls "NotificationListenerService.Ranking" to get ranking information of active notifications on the user device. In general, "NotificationListenerService.Ranking" is a service that stores ranking-related information on a currently active notification.

Once the OTP is received on the user device, the server system 108 looks for service logs on the user device related to calling an API function "REASON CANCEL" which returns a constant value (for example, '2') or calling an API function "REASON SNOOZED" which returns a constant value (for example, '18') on the user device. In general, the function "method REASON CANCEL" is called if the notification is canceled by the status bar reporting a user dismissal, and the function "REASON SNOOZED" is called if the notification is snoozed by the cardholder 102.

Further, the server system 108 creates an instance of ActivityMonitor( ) class to intercept user activity performed on the notification by calling method getHits( ). In general, ActivityMonitor( ) is a class that looks for a particular kind of intent to be started. In addition, getHits( ) is a method that retrieves the number of times the monitor or display has been hit so far.

Additionally, the server system 108 also calculates time differences among email/SMS received time with OTP, a timestamp when the OTP was entered by the cardholder 102, and time of transaction submission on the user device which initiates the payment transaction. In one embodiment, the server system 108 also monitors the dark mode of mobile and wearable user devices which are registered for device behavior analyzer service. The server system 108 identifies the anomalies in device usage pattern and the same will be validated once the OTP is entered. The server system 108 is configured to monitor various parameters such as time spent on financial application, battery status (i.e., mobile battery status score), and network connection status.

At 508*c*, the server system 108 looks up for the read receipt flag in response to the OTP received during the MFA on each user device of the one or more user devices. The read receipt flag is set on the one or more user devices when the cardholder 102 reads the OTP on the one or more user devices through email and/or SMS.

At 510, the server system 108 determines or calculates the device behavioral score for the user device based, at least in part, on results of steps 508*a*-508*c*. In one embodiment, the device behavioral score is a score value in a range of values (e.g., 0 to 100, 100 to 1000, etc.). The device behavioral score is further compared with a predetermined threshold value to check if the determined device behavioral score is greater than the predetermined threshold value or not. The predetermined threshold value can be set by the issuer server 114. When the device behavioral score is greater than the predetermined threshold value, the server system 108 may set the device behavioral flag in the MFA token to yes or Y or 1, else no or N or 0 respectively. In one embodiment, the server system 108 may set a device behavioral flag of MFA token when the device behavioral score of each user device of the one or more user devices is greater than a predetermined threshold value. In one embodiment, the predetermined threshold value for each user device may be different.

At 512, the server system 108 may determine user activities on the one or more user devices based, at least in part, on corresponding read receipt flags. The read receipt flag is set when the cardholder 102 reads the OTP on the user device through email and/or SMS.

At 514, the server system 108 checks whether there is user activity detected on at least one of the one or more user devices or not.

When the server system 108 detects zero user activity on the one or more user devices, at 516, the server system 108 identifies a new user device associated with the cardholder 102 that is used for reading the OTP by the cardholder 102 during the MFA process.

At 518, the server system 108 sends an enrollment verification request to the plurality of registered user devices 104a-104c to enroll the new user device 104d associated with the cardholder 102. In one embodiment, the server system 108 sets the new device detection flag upon identifying that the new user device 104d is used for reading the OTP during the MFA of the payment transaction.

At 520, when the server system 108 detects the user activity on any one of the one or more user devices 104a-104c, the server system 108 generates the MFA token.

Figure 6:
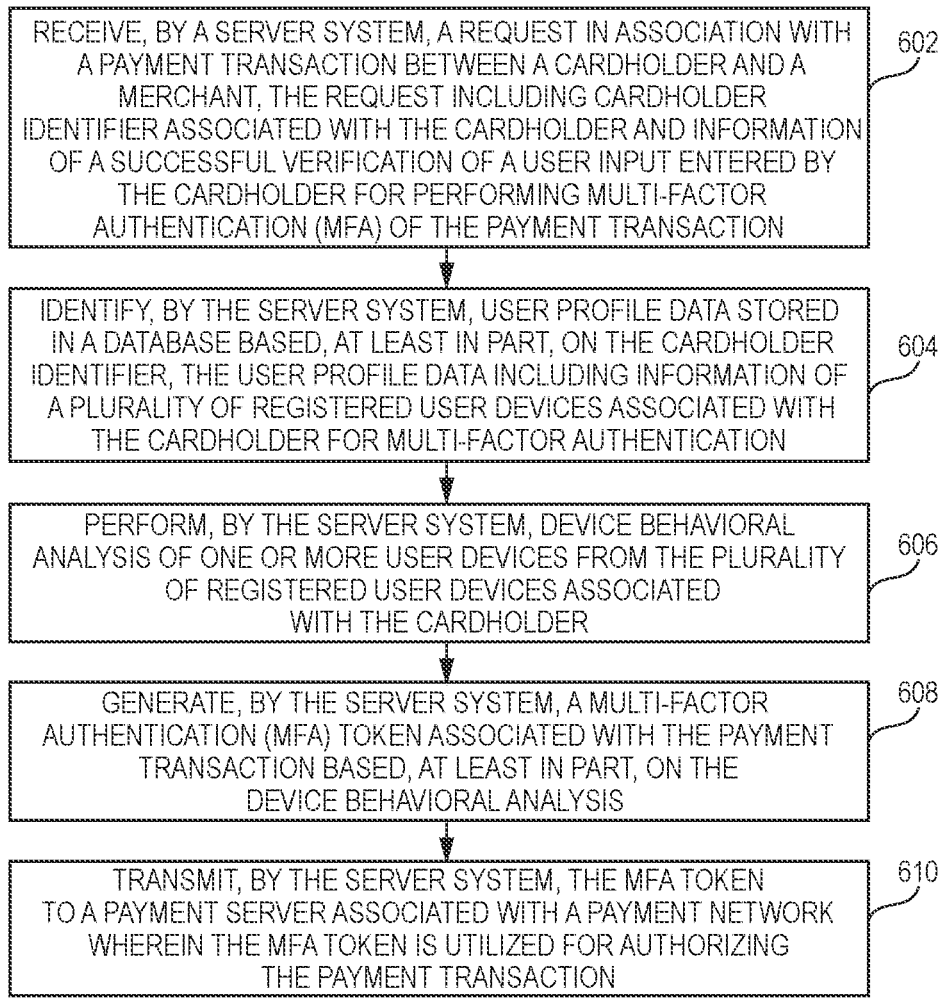
FIG. 6 illustrates a flow diagram depicting a computer-implemented method for analyzing device behavior data of user devices of a cardholder in multi-factor authentication based payment transactions, in accordance with an embodiment of the present disclosure.

FIG. 6 illustrates a flow diagram depicting a computer-implemented method 600 for analyzing device behavior data of user devices of a cardholder 102 in multi-factor authentication-based payment transactions, in accordance with an embodiment of the present disclosure. The method 600 depicted in the flow diagram may be executed by, for example, the server system 108. Operations of the method 600, and combinations of operation in the method 600, may be implemented by, for example, hardware, firmware, a processor, circuitry, and/or a different device associated with the execution of software that includes one or more computer program instructions. The operations of the method 600 are described herein may be performed by an application interface that is hosted and managed with help of the server system 108. The method 600 starts at operation 602.

At operation 602, the method 600 includes receiving, by the server system 108, the request in association with the payment transaction between the cardholder 102 and the merchant 106. The request includes cardholder identifier associated with the cardholder 102 and information of successful verification of a user input entered by the cardholder 102 for performing the multi-factor authentication (MFA) of the payment transaction.

At operation 604, the method 600 includes identifying, by the server system 108, the user profile data stored in the database 122 based, at least in part, on the cardholder identifier. The user profile data includes information of the plurality of registered user devices 104a-104c associated with the cardholder 102 for the MFA.

At operation 606, the method 600 includes performing, by the server system 108, device behavioral analysis of one or more user devices from the plurality of registered user devices 104a-104c associated with the cardholder 102.

At operation 608, the method 600 includes generating, by the server system 108, the multi-factor authentication (MFA) token associated with the payment transaction based, at least in part, on the device behavioral analysis.

At operation 610, the method 600 includes transmitting, by the server system 108, the MFA token to the payment server 118 associated with the payment network 116. The MFA token is utilized for authorizing the payment transaction at the issuer 114 and confirms whether the user devices involved in the MFA process are trusted devices of the cardholder 102 or not.

The sequence of operations of the method 600 need not be necessarily executed in the same order as they are presented. Further, one or more operations may be grouped together and performed in form of a single step, or one operation may have several sub-steps that may be performed in parallel or in a sequential manner.

Figure 7:
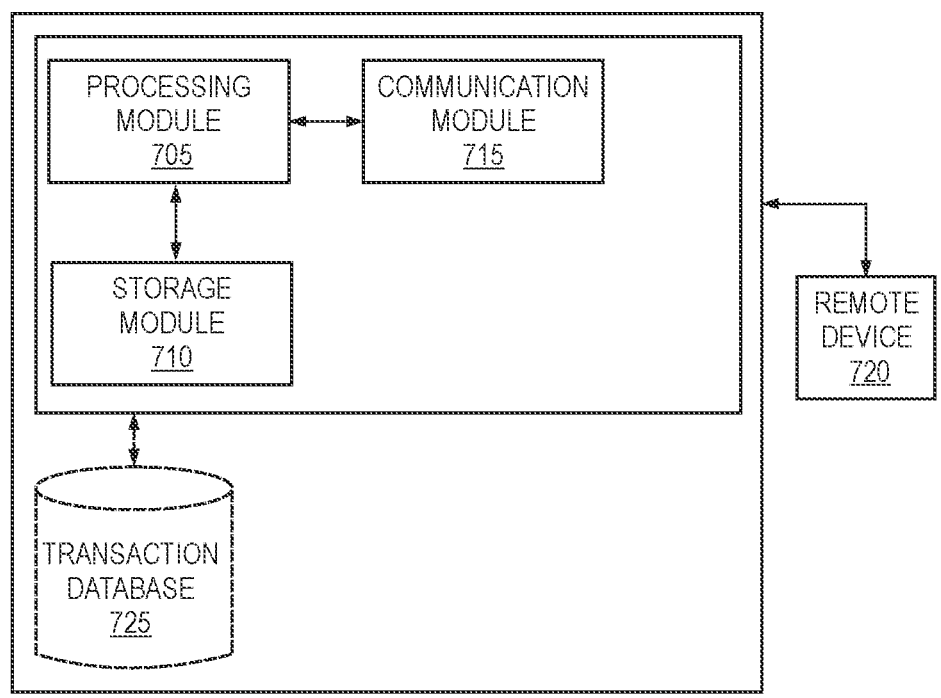
FIG. 7 is a simplified block diagram of an issuer server, in accordance with an embodiment of the present disclosure.

FIG. 7 is a simplified block diagram of an issuer server 700, in accordance with an embodiment of the present disclosure. The issuer server 700 is an example of the issuer server 114 of FIG. 1. The issuer server 700 is associated with an issuer bank/issuer, in which the cardholder 102 may have an account, which provides a payment card. The issuer server 700 includes a processing module 705 operatively coupled to a storage module 710 and a communication module 715. The components of the issuer server 700 provided herein may not be exhaustive and the issuer server 700 may include more or fewer components than those depicted in FIG. 7. Further, two or more components may be embodied in one single component, and/or one component may be configured using multiple sub-components to achieve the desired functionalities. Some components of the issuer server 700 may be configured using hardware elements, software elements, firmware elements, and/or a combination thereof.

The storage module 710 is configured to store machine-executable instructions to be accessed by the processing module 705. Additionally, the storage module 710 stores information related to, the contact information of the cardholder 102, bank account number, availability of funds in the account, payment card details, transaction details, and/or the like. Further, the storage module 710 is configured to store payment transactions.

In one embodiment, the issuer server 700 is configured to store profile data (e.g., an account balance, a credit line, details of the cardholder 102, account identification information, payment card number) in a transaction database (e.g., the database 725). The details of the cardholder 102 may include, but are not limited to, name, age, gender, physical attributes, location, registered contact number, family information, alternate contact number, registered e-mail address, or the like of the cardholder 102, etc.

The processing module 705 is configured to communicate with one or more remote devices such as a remote device 720 using the communication module 715 over a network such as the network 110 of FIG. 1. The examples of the remote device 720 include the server system 108, the payment server 118, the database 122 or other computing systems of the issuer server 700 and the network 110, and the like. The communication module 715 is capable of facilitating such operative communication with the remote devices and cloud servers using Application Program Interface (API) calls. The communication module 715 is configured to receive a payment transaction request performed by the cardholder 102 via the network 110. The processing module 705 receives payment card information, a payment transaction amount, customer information, and merchant information from the remote device 720 (i.e., the payment server 118).

Figure 8:
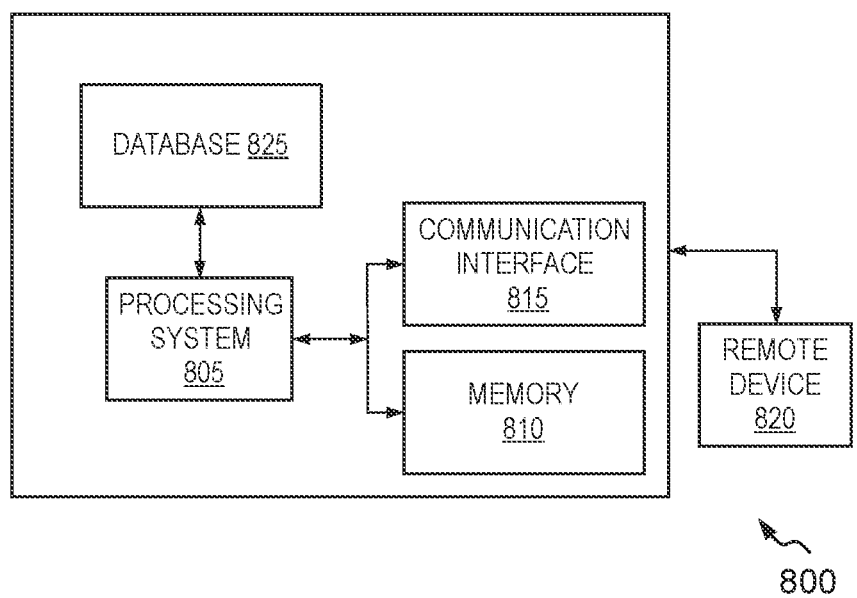
FIG. 8 is a simplified block diagram of a payment server, in accordance with an embodiment of the present disclosure.

FIG. 8 is a simplified block diagram of a payment server 800, in accordance with an embodiment of the present disclosure. The payment server 800 is an example of the payment server 118 of FIG. 1. The payment server 800, and the server system 108 of FIG. 1 may use the payment network 116 as a payment interchange network. Examples of payment interchange networks include, but are not limited to, Mastercard® payment system interchange network.

The payment server 800 includes a processing system 805 configured to extract programming instructions from a memory 810 to provide various features of the present disclosure. The components of the payment server 800 provided herein may not be exhaustive and that the payment server 800 may include more or fewer components than that depicted in FIG. 8. Further, two or more components may be embodied in one single component, and/or one component may be configured using multiple sub-components to achieve the desired functionalities. Some components of the payment server 800 may be configured using hardware elements, software elements, firmware elements, and/or a combination thereof.

Via a communication interface 815, the processing system 805 receives a request from a remote device 820, such as the acquirer server 112, a merchant device associated with the merchant 106, or a customer device (e.g., the user device 104*d*) hosting a payment gateway application. The request may be a request for conducting the payment transaction. The communication may be achieved through API calls, without loss of generality. The payment server 800 includes a database 825. The database 825 also includes transaction processing data such as Issuer ID, POS ID, country code, acquirer ID, merchant identification number (MID), among others.

When the payment server 800 receives a payment transaction request from the acquirer server 112 or a payment terminal (e.g., POS machine, ATM terminal, etc.), the payment server 800 may route the payment transaction request to an issuer server (e.g., the issuer server 114 of FIG. 1). The database 825 stores transaction identifiers for identifying transaction details (such as transaction amount, payment card details, acquirer account information, transaction records, merchant account information, and the like).

In one example embodiment, the acquirer server 112 is configured to send an authorization request message to the payment server 800. The authorization request message includes, but is not limited to, the payment transaction request.

The processing system 805 further sends the payment transaction request to the issuer server 114 for facilitating payment transactions from the remote device 820. The processing system 805 is further configured to notify the remote device 820 of the transaction status in form of an authorization response message via the communication interface 815. The authorization response message includes, but is not limited to, a payment transaction response received from the issuer server 114. Alternatively, in one embodiment, the processing system 805 is configured to send an authorization response message for declining the payment transaction request, via the communication interface 815, to the acquirer server 112.

Figure 9:
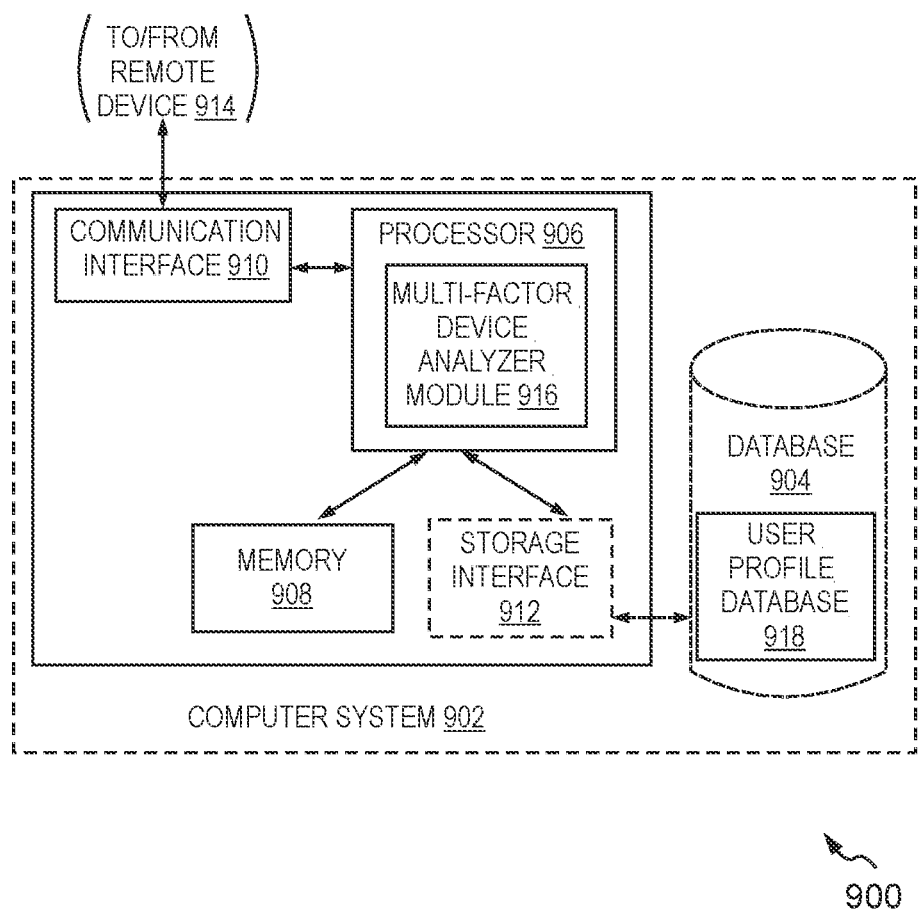
FIG. 9 is a simplified block diagram of a server system, in accordance with an embodiment of the present disclosure.

FIG. 9 is a simplified block diagram of a server system 900, in accordance with an embodiment of the present disclosure. The server system 900 includes a computer system 902 and a database 904. In an embodiment, the server system 900 is integrated, but not limited to, in the server system 108. The server system 900 is communicably linked to the payment network 116, the issuer server 114, and the acquirer server 112.

The computer system 902 includes at least one processor 906 configured to execute executable instructions for providing various features of the present disclosure. The executing instructions are stored in a memory 908. The components of the computer system 902 provided herein may not be exhaustive and that the computer system 902 may include more or fewer components than that of depicted in FIG. 9. Further, two or more components may be embodied in one single component, and/or one component may be configured using multiple sub-components to achieve the desired functionalities. Some components of the computer system 902 may be configured using hardware elements, software elements, firmware elements, and/or a combination thereof.

The processor 906 is operatively coupled to a communication interface 910 such that the computer system 902 is capable of communicating with a remote device 914 such as the access control server 120, associated with the issuer server 114 (shown in FIG. 1), respectively or communicated with any entity connected to the network 110 (shown in FIG. 1) or any constituents of the acquirer server 112. In an embodiment, the communication interface 910 is configured to receive a request associated with a payment transaction from a server (e.g., the payment server 118 of FIG. 1). In addition, the communication interface 910 is configured to send a request for performing the device behavioral analysis of the one or more user devices of the plurality of user devices 104*a*-104*d*. The communication interface 910 is further configured to transmit the multi-factor authentication (MFA) token to the payment server 118 for authorization of the payment transaction. Furthermore, the communication interface 910 is configured to send an enrollment verification request to at least one of the plurality of registered user devices 104*a*-104*d* for enabling the cardholder 102 to enroll the new user device (e.g., the user device 104*d* in FIG. 4) with the plurality of registered user devices 104*a*-104*c* (in FIG. 4).

The processor 906 may also be operatively coupled to the database 904. The database 904 is an example of the database 122. In one embodiment, the database 122 includes a user profile database 918. The user profile database 918 is a repository of user profile data stored for various cardholders (e.g., the cardholder 102). The user profile data may include tabular data of device authentication parameters corresponding to registered user devices for each cardholder stored in the user profile database 918. The database 904 is any computer-operated hardware suitable for storing and retrieving data, such as but not limited to, information of the card issuers, information of the merchant 106, transaction data generated as part of sales activities conducted over the payment network 116 including data relating to merchants, payees, or customers, and purchases. The database 904 may also store transaction status, information of failed transactions, bank details of the merchant 106, credentials of the merchant 106, security certificates, and the like. The database 904 may include multiple storage units such as hard disks and/or solid-state disks in a redundant array of inexpensive disks (RAID) configuration. The database 904 may include a storage area network (SAN) and/or a network attached storage (NAS) system.

In some embodiments, the database 904 is integrated within the computer system 902. For example, the computer system 902 may include one or more hard disk drives as the database 904. The storage interface 912 is any component capable of providing the processor 906 with access to the database 904. The storage interface 912 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 906 with access to the database 904.

The processor 906 includes a multi-factor device analyzer module 916. The multi-factor device analyzer module 916 is configured to receive the request in association with the payment transaction between the cardholder (e.g., 102 of FIG. 1) and the merchant (e.g., 106 of FIG. 1). The request includes a cardholder identifier associated with the cardholder (e.g., 102 of FIG. 1) and information of successful verification of a user input entered by the cardholder (e.g., 102 of FIG. 1) for performing the multi-factor authentication (MFA) of the payment transaction. In addition, the multi-factor device analyzer module 916 is configured to identify user profile data stored in a database (e.g., 122 of FIG. 1) based, at least in part, on the cardholder identifier. The user profile data includes information of a plurality of registered user devices (e.g., 104a-104d of FIG. 1) associated with the cardholder (e.g., 102 of FIG. 1) for the MFA. Further, the multi-factor device analyzer module 916 is configured to perform device behavioral analysis of one or more user devices from the plurality of registered user devices (e.g., 104a-104d of FIG. 1) associated with the cardholder (e.g., 102 of FIG. 1). Furthermore, the multi-factor device analyzer module 916 is configured to generate the MFA token associated with the payment transaction based, at least in part, on the device behavioral analysis. Moreover, the multi-factor device analyzer module 916 is configured to transmit the MFA token to the payment server (e.g., 118 of FIG. 1) associated with the payment network (e.g., 116 of FIG. 1). The MFA token is utilized for authorizing the payment transaction.

Figure 10:
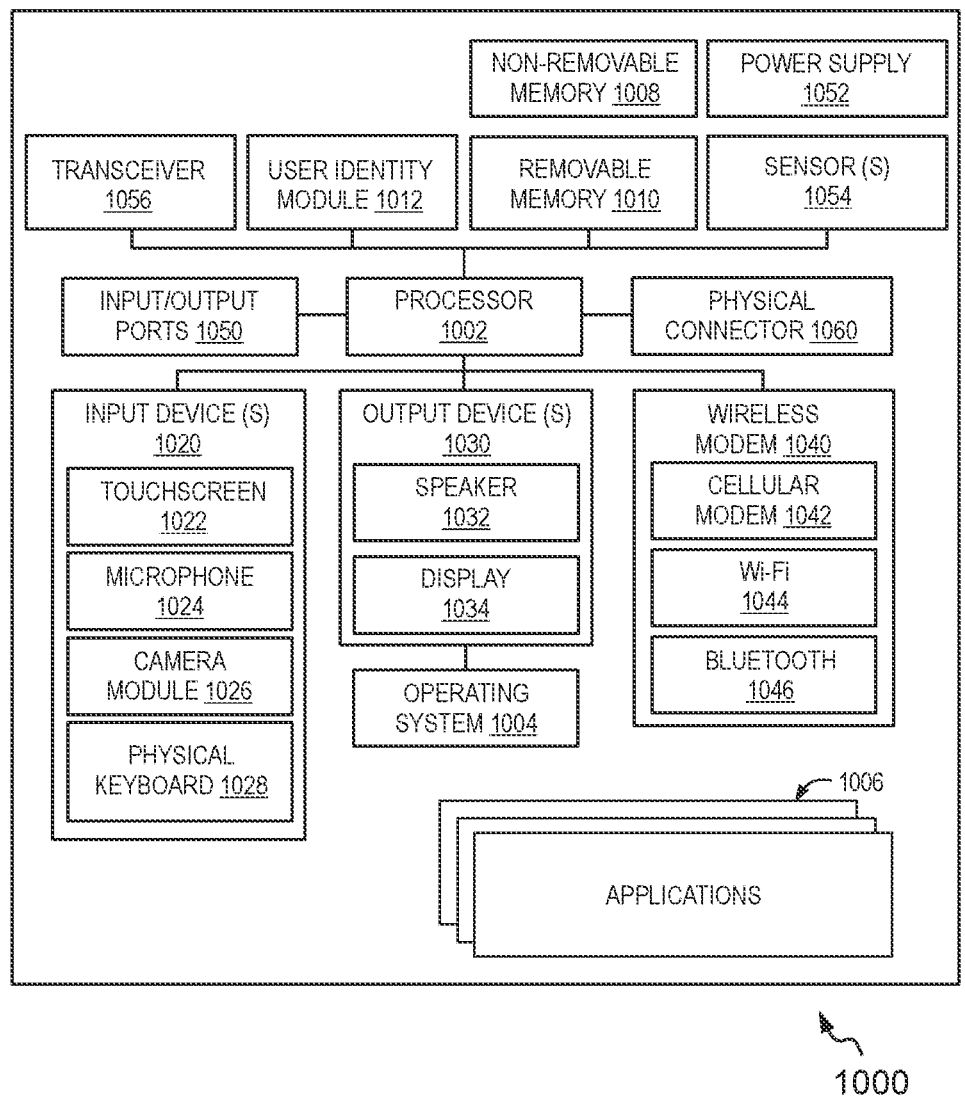
FIG. 10 shows a simplified block diagram of a device capable of implementing the various embodiments of the present disclosure.

FIG. 10 shows a simplified block diagram of a device 1000 for example, each of the plurality of user devices 104a-104d of FIG. 1 capable of implementing the various embodiments of the present disclosure. The device 1000 is depicted to include one or more applications 1006. The device 1000 is an example of each of the plurality of user devices 104a-104d. It should be understood that the device 1000 as illustrated and hereinafter described is merely illustrative of one type of device and should not be taken to limit the scope of the embodiments. As such, it should be appreciated that at least some of the components described below in connection with that the device 1000 may be optional, and thus in an example embodiment may include more, less, or different components than those described in connection with the example embodiment of FIG. 10. As such, among other examples, the device 1000 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated device 1000 includes a controller or a processor 1002 (e.g., a signal processor, microprocessor, ASIC, or other control and processing logic circuitry) for performing such tasks as signal coding, data processing, image processing, input/output processing, power control, and/or other functions. An operating system 1004 controls the allocation and usage of the components of the device 1000 and support for one or more applications programs (see, applications 1006), such as an application interface in a user device (e.g., the plurality of user devices 104a-104d) of a user (e.g., the cardholder 102) or an application interface in a user device (e.g., each of the plurality of user devices 104a-104d). The application interface in the device 1000 is used for entering the user authentication response message, entering the one or more authentication response messages for the device behavioral analysis, and the like. In addition to the application interface, the applications 1006 may include common mobile computing applications (e.g., telephony applications, email applications, calendars, contact managers, web browsers, messaging applications such as USSD messaging or SMS messaging or SIM Tool Kit (STK) application) or any other computing application.

The illustrated device 1000 includes one or more memory components, for example, a non-removable memory 1008 and/or removable memory 1010. The non-removable memory 1008 and/or removable memory 1010 may be collectively known as database in an embodiment. The non-removable memory 1008 can include RAM, ROM, flash memory, a hard disk, or other well-known memory storage technologies. The removable memory 1010 can include flash memory, smart cards, or a Subscriber Identity Module (SIM). The one or more memory components can be used for storing data and/or code for running the operating system 1004 and the applications 1006. The device 1000 may further include a user identity module (UIM) 1012. The UIM 1012 may be a memory device having a processor built-in. The UIM 1012 may include, for example, a subscriber identity module (SIM), a universal integrated circuit card (UICC), a universal subscriber identity module (USIM), a removable user identity module (R-UIM), or any other smart card. The UIM 1012 typically stores information elements related to a mobile subscriber. The UIM 1012 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA7000, wideband CDMA (WCDMA) and time division-synchronous CDMA (TD-SCDMA), or with fourth-generation (4G) wireless communication protocols such as LTE (Long-Term Evolution).

The device 1000 can support one or more input devices 1020 and one or more output devices 1030. Examples of the input devices 1020 may include, but are not limited to, a touch screen/a screen 1022 (e.g., capable of capturing finger tap inputs, finger gesture inputs, multi-finger tap inputs, multi-finger gesture inputs, or keystroke inputs from a virtual keyboard or keypad), a microphone 1024 (e.g., capable of capturing voice input), a camera module 1026 (e.g., capable of capturing still picture images and/or video images) and a physical keyboard 1028. Examples of the output devices 1030 may include but are not limited to a speaker 1032 and a display 1034. Other possible output devices can include piezoelectric or other haptic output devices. Some devices can serve more than one input/output function. For example, the touch screen 1022 and the display 1034 can be combined into a single input/output device.

A wireless modem 1040 can be coupled to one or more antennas (not shown in FIG. 10) and can support two-way communications between the processor 1002 and external devices, as is well understood in the art. The wireless modem 1040 is shown generically and can include, for example, a cellular modem 1042 for communicating at long range with the mobile communication network, a Wi-Fi compatible modem 1044 for communicating at short range with an external Bluetooth-equipped device, or a local wireless data network or router, and/or a Bluetooth-compatible modem 1046. The wireless modem 1040 is typically configured for communication with one or more cellular networks, such as a GSM network for data and voice communications within a single cellular network, between cellular networks, or between the device 1000 and a public switched telephone network (PSTN).

The device 1000 can further include one or more input/output ports 1050 for establishing a connection with peripheral devices including a power supply 1052, one or more sensors 1054 for example, an accelerometer, a gyroscope, a compass, or an infrared proximity sensor for detecting the orientation or motion of the device 1000 and biometric sensors for scanning biometric identity of an authorized user, a transceiver 1056 (for wirelessly transmitting analog or digital signals) and/or a physical connector 1060, which can be a USB port, IEEE 1294 (FireWire) port, and/or RS-232 port. The illustrated components are not required or all-inclusive, as any of the components shown can be deleted and other components can be added. With the application (see, applications 1006) and/or other software or hardware components, the device 1000 can implement the technologies described herein.

Without limiting the scope of the present disclosure, the one or more example embodiments disclosed herein provide methods and systems for reducing fraud in the multi-factor authentication (MFA) process performed for authentication of the payment transactions. The security of the MFA process is improved by authenticating or verifying the user devices through which the two or more authentication tokens related to the MFA process are received. This authentication may be performed irrespective of the number of user devices associated with a cardholder or the location of the user devices from which the two or more authentication tokens are received The disclosed methods with reference to FIGS. 1 to 10, or one or more operations of the method 600 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, netbook, Webbook, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal-oxide-semiconductor (CMOS) based logic circuitry), firmware, software, and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or in Digital Signal Processor (DSP) circuitry).

Particularly, the server system 900 (e.g., the server system 108) and its various components such as the computer system 902 and the database 904 may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read-only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
   receiving, by a server system, a request in association with a payment transaction between a cardholder and a merchant, the request comprising a cardholder identifier associated with the cardholder, and information of a successful verification of a user input entered by the cardholder for performing multi-factor authentication (MFA) of the payment transaction;
   identifying, by the server system, user profile data stored in a database based, at least in part, on the cardholder identifier, the user profile data comprising information of a plurality of registered user devices associated with the cardholder for the MFA;

performing, by the server system, device behavioral analysis of one or more user devices from the plurality of registered user devices associated with the cardholder including calculating a device behavioral score by:
  (a) obtaining device identifiers from the one or more user devices and comparing the obtained device identifiers with authenticated identifiers already stored in the user profile data associated with the cardholder,
  (b) determining that the cardholder is logged into email accounts of the cardholder running on the one or more user devices,
  (c) determining a time of receipt of a one time password (OTP) associated with performing multi-factor authentication (MFA) of the payment transaction and calculating a time differences between a received time of the OTP and a time of entering the OTP,
  (d) determining a period of the one or more user devices spent in a dark mode,
  (e) calculating a device behavioral score for the user device based, at least in part, on results of steps (a), (b), (c), and (d), and
generating, by the server system, an MFA token associated with the payment transaction based, at least in part, on the device behavioral analysis;
transmitting, by the server system, the MFA token to a payment server associated with a payment network, wherein the MFA token is utilized for authorizing the payment transaction; and
authorizing the payment transaction.

2. The computer-implemented method as claimed in claim 1, wherein the information of the plurality of registered user devices in the user profile data comprises a set of device authentication parameters associated with each user device of the plurality of registered user devices captured during a device registration process.

3. The computer-implemented method as claimed in claim 2, wherein the set of device authentication parameters comprises device universally unique identifier (UUID), hard drive serial number, MachineGUID, media access control (MAC) address, dynamic host configuration protocol (DHCP) value, and domain name system (DNS) value.

4. The computer-implemented method as claimed in claim 3, wherein a new device detection flag is set upon identifying that a new user device is used for reading the OTP.

5. The computer-implemented method as claimed in claim 3, wherein the device behavioral flag is set when the device behavioral score of each user device of the one or more user devices is greater than a predetermined threshold value.

6. The computer-implemented method as claimed in claim 1, wherein the MFA token comprises
  (a) transaction identifier,
  (b) merchant identifier,
  (c) device behavior analyzer service opt-in flag,
  (d) new device detection flag,
  (e) device behavioral flag, and
  (f) device activity status flag.

7. The computer-implemented method as claimed in claim 1, wherein method further includes:
comparing the calculated device behavioral score with a threshold value;
setting a device behavioral flag in the MFA token to Yes upon determining that the calculated device behavioral score is greater than the threshold value; or
setting a device behavioral flag in the MFA token to No upon determining that the device behavioral score is less than the threshold value.

8. The computer-implemented method as claimed in claim 1, further comprising:
to determining a zero user activity on the one or more user devices;
in response to determining the zero user activity on the one or more user devices, identifying, by the server system, a new user device associated with the cardholder that is used for reading the OTP by the cardholder;
sending, by the server system, an enrolment verification request to at least one of the plurality of registered user devices;
receiving, by the server system, user consent from at least one of the plurality of registered user devices for enrolling the new user device for the MFA;
capturing, by the server system, a plurality of device authentication parameters associated with the new user device from the new user device; and
storing, by the server system, the plurality of device authentication parameters into the user profile data of the cardholder.

9. The computer-implemented method as claimed in claim 1, wherein the server system is associated with the payment network.

10. A server system comprising:
a memory storing computer-executable instructions; and
a processor configured to execute the instructions to:
  receive, by a server system, a request in association with a payment transaction between a cardholder and a merchant, the request comprising a cardholder identifier associated with the cardholder, and information of a successful verification of a user input entered by the cardholder for performing multi-factor authentication (MFA) of the payment transaction;
  identify, by the server system, user profile data stored in a database based, at least in part, on the cardholder identifier, the user profile data comprising information of a plurality of registered user devices associated with the cardholder for the MFA;
  perform, by the server system, device behavioral analysis of one or more user devices from the plurality of registered user devices associated with the cardholder including calculating a device behavioral score by:
    (a) obtaining device identifiers from the one or more user devices and comparing the obtained device identifiers with authenticated identifiers already stored in the user profile data associated with the cardholder,
    (b) determining that the cardholder is logged into email accounts of the cardholder running on the one or more user devices,
    (c) determining a time of receipt of a one time password (OTP) associated with performing multi-factor authentication (MFA) of the payment transaction and calculating a time differences between a received time of the OTP and a time of entering the OTP,
    (d) determining a period of the one or more user devices spent in a dark mode,
    (e) calculating a device behavioral score for the user device based, at least in part, on results of steps (a), (b), (c), and (d), and generate, by the server system, an MFA token associated with the payment transaction based, at least in part, on the device behavioral analysis;

transmit, by the server system, the MFA token to a payment server associated with a payment network, wherein the MFA token is utilized for authorizing the payment transaction; and authorize the payment transaction.

11. The server system as claimed in claim 10, wherein the information of the plurality of registered user devices in the user profile data comprises a set of device authentication parameters associated with each user device of the plurality of registered user devices captured during a device registration process.

12. The server system as claimed in claim 11, wherein the set of device authentication parameters comprises device universally unique identifier (UUID), hard drive serial number, MachineGUID, media access control (MAC) address, dynamic host configuration protocol (DHCP) value, and domain name system (DNS) value.

13. The server system as claimed in claim 12, wherein a new device detection flag is set upon identifying that a new user device is used for reading the OTP.

14. The server system as claimed in claim 12, wherein the device behavioral flag is set when the device behavioral score of each user device of the one or more user devices is greater than a predetermined threshold value.

15. The server system as claimed in claim 10, wherein the MFA token comprises
  (a) transaction identifier,
  (b) merchant identifier,
  (c) device behavior analyzer service opt-in flag,
  (d) new device detection flag,
  (e) device behavioral flag, and
  (f) device activity status flag.

16. The server system as claimed in claim 10, wherein the processor is configured to:
  compare the calculated device behavioral score with a threshold value;
  set a device behavioral flag in the MFA token to Yes upon determining that the calculated device behavioral score is greater than the threshold value; or
  set a device behavioral flag in the MFA token to No upon determining that the device behavioral score is less than the threshold value.

17. The server system as claimed in claim 10, wherein the processor is further configured to execute the instructions to:
  determine a zero user activity on the one or more user devices;
  in response to determining the zero user activity on the one or more user devices, identify, by the server system, a new user device associated with the cardholder that is used for reading the OTP by the cardholder;
  send, by the server system, an enrolment verification request to at least one of the plurality of registered user devices;
  receive, by the server system, user consent from at least one of the plurality of registered user devices for enrolling the new user device for the MFA;
  capture, by the server system, a plurality of device authentication parameters associated with the new user device from the new user device; and store, by the server system, the plurality of device authentication parameters into the user profile data of the cardholder.

18. The server system as claimed in claim 10, wherein the server system is associated with the payment network.

19. One or more non-transitory computer storage media having computer-executable instructions that, upon execution by a processor, cause the processor to at least:
  receive a request in association with a payment transaction between a cardholder and a merchant, the request comprising a cardholder identifier associated with the cardholder, and information of a successful verification of a user input entered by the cardholder for performing multi-factor authentication (MFA) of the payment transaction;
  identify user profile data stored in a database based, at least in part, on the cardholder identifier, the user profile data comprising information of a plurality of registered user devices associated with the cardholder for the MFA;
  perform device behavioral analysis of one or more user devices from the plurality of registered user devices associated with the cardholder including calculating a device behavioral score by:
  (a) obtaining device identifiers from the one or more user devices and comparing the obtained device identifiers with authenticated identifiers already stored in the user profile data associated with the cardholder,
  (b) determining that the cardholder is logged into email accounts of the cardholder running on the one or more user devices,
  (c) determining a time of receipt of a one time password (OTP) associated with performing multi-factor authentication (MFA) of the payment transaction and calculating a time differences between a received time of the OTP and a time of entering the OTP,
  (d) determining a period of the one or more user devices spent in a dark mode,
  (e) calculating a device behavioral score for the user device based, at least in part, on results of steps (a), (b), (c), and (d), and
  generate, by the server system, an MFA token associated with the payment transaction based, at least in part, on the device behavioral analysis;
  transmit, by the server system, the MFA token to a payment server associated with a payment network, wherein the MFA token is utilized for authorizing the payment transaction and
  authorize the payment transaction.

20. The one or more non-transitory computer storage media of claim 19, wherein the computer-executable instructions upon execution by the processor, further cause the processor to:
  compare the calculated device behavioral score with a threshold value;
  set a device behavioral flag in the MFA token to Yes upon determining that the calculated device behavioral score is greater than the threshold value; or
  set a device behavioral flag in the MFA token to No upon determining that the device behavioral score is less than the threshold value.

* * * * *